(12) United States Patent
Isuyama

(10) Patent No.: US 8,616,452 B2
(45) Date of Patent: Dec. 31, 2013

(54) SENSOR MODULE AND SENSOR MODULE MANUFACTURING METHOD

(75) Inventor: Yasuo Isuyama, Sao Paulo (BR)

(73) Assignee: CIS Eletronica Industria e Comercio Ltda., Sao Paulo, SP (BR)

( * ) Notice: Subject to any disclaimer, the term of this patent is extended or adjusted under 35 U.S.C. 154(b) by 68 days.

(21) Appl. No.: 13/201,692

(22) PCT Filed: Feb. 19, 2010

(86) PCT No.: PCT/JP2010/052498
§ 371 (c)(1),
(2), (4) Date: Aug. 16, 2011

(87) PCT Pub. No.: WO2010/095703
PCT Pub. Date: Aug. 26, 2010

(65) Prior Publication Data
US 2011/0297745 A1    Dec. 8, 2011

(30) Foreign Application Priority Data
Feb. 20, 2009  (JP) ................................. 2009-037297

(51) Int. Cl.
G06K 7/08    (2006.01)
(52) U.S. Cl.
USPC ......................................................... 235/449

(58) Field of Classification Search
USPC .................................................. 235/449, 493
See application file for complete search history.

(56) References Cited

U.S. PATENT DOCUMENTS

| | | | | |
|---|---|---|---|---|
| 4,797,541 A | * | 1/1989 | Billings et al. | 235/449 |
| 2009/0173790 A1 | * | 7/2009 | Hart et al. | 235/449 |

FOREIGN PATENT DOCUMENTS

| | | |
|---|---|---|
| JP | 01-143186 | 10/1989 |
| JP | 05-002844 | 1/1993 |
| JP | 2001-043661 | 2/2001 |
| JP | 2002-131446 | 5/2002 |
| JP | 2002-189987 | 7/2002 |
| JP | 2008-293628 | 12/2008 |

* cited by examiner

Primary Examiner — Thien T Mai
(74) Attorney, Agent, or Firm — Clark & Brody

(57) ABSTRACT

Provided is a sensor module capable of ensuring security of data in which card data output from a magnet head is not stolen by a third party.

In a sensor module 10A, a front-end portion of a flexible substrate 13 to which a connection terminal, a resistive element, an A/D conversion chip, and a digital IC are attached is accommodated in a housing 11 with a predetermined capacity in a state of being folded into four in one direction and the connection terminal, the resistive element, the A/D conversion chip, and the digital IC are fixed to the housing 11 together with the front-end portion of the flexible substrate 13 by means of epoxy resin filled in the housing 11.

3 Claims, 33 Drawing Sheets

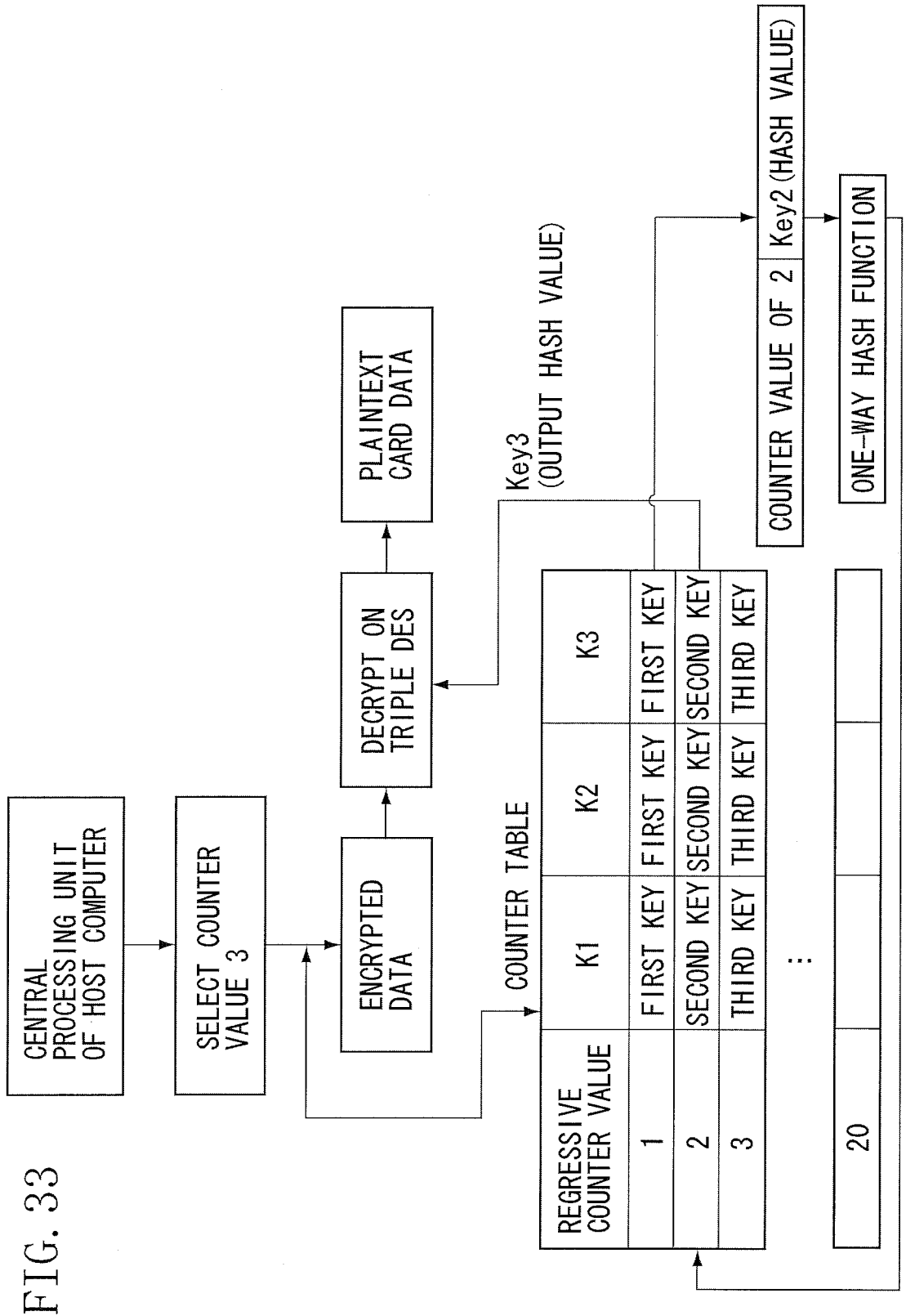

SENSOR MODULE AND SENSOR MODULE MANUFACTURING METHOD

TECHNICAL FIELD

The present invention relates to a sensor module and sensor module manufacturing method.

BACKGROUND ART

There is a sensor module formed of a lens-integrated case provided with a dome-shaped lens unit and a cylindrical case unit extending downward from a lower end thereof, an attaching plate accommodated in the case unit, a circuit substrate accommodated in the case unit to be arranged below the attaching plate, a sensor fixed to an upper surface of the attaching plate, and a lower plate for blocking a lower-end opening of the case unit (refer to the patent document 1). In the sensor module, a plurality of terminals extending downward from the sensor penetrate the attaching plate, the circuit substrate, and the lower plate so as to protrude downward from the lower plate. The sensor is connected to the circuit substrate on a portion on which the terminal penetrates the circuit substrate. The circuit substrate converts an analog signal output from the sensor to a digital signal while amplifying the same. In the sensor module, the sensor fixed to the attaching plate and the circuit substrate are accommodated in a stacked manner in the lens-integrated case and the lower-end opening of the case unit is covered with the lower plate, so that they may be stored in the lens-integrated case and downsizing of the sensor module may be realized.

CITATION LIST

Patent Literature

Japanese Patent Application Laid-Open No. 2002-131446

SUMMARY OF THE INVENTION

Problem to be Solved by the Invention

Although the sensor module disclosed in the above-described publication converts the analog signal output from the sensor to the digital signal while amplifying the same in the circuit substrate attached to the sensor module, this cannot encrypt the digital signal. Therefore, there is a case in which a third party intercepts the digital signal output from the sensor module and data is acquired by the third party from the digital signal. Also, since the attaching plate and the circuit substrate are exposed in the lens-integrated case, it is possible to take the circuit substrate out of the lens-integrated case and install a circuit for stealing the data thereon, so that security of the data cannot be ensured.

An object of the present invention is to provide the sensor module capable of ensuring the security of the data in which various data output from the sensor is not stolen by the third party and the method of manufacturing the sensor module.

Means for Solving the Problem

A sensor module according to the present invention for solving the above-described problem comprises a flexible substrate extending in one direction; a signal processing device installed on a front-end portion of the flexible substrate; and a sensor element for converting a measured volume from a measuring target to an analog signal, the signal processing device including a connection terminal connected to the sensor element for receiving the analog signal output from the sensor element, an A/D conversion chip connected to the connection terminal for converting the analog signal received by the connection terminal from the sensor element to a digital signal, and a digital IC connected to the A/D conversion chip for encrypting the digital signal output from the A/D conversion chip, wherein the front-end portion of the flexible substrate to which the connection terminal, the A/D conversion chip, and the digital IC are attached is accommodated in a housing with a predetermined capacity in a state of being folded at least into two in the one direction, and the connection terminal, the A/D conversion chip, and the digital IC are fixed to the housing together with the front-end portion of the flexible substrate by means of a solidification substance filled in the housing.

As an example of the sensor module according to the present invention, the connection terminal, the A/D conversion chip, and the digital IC are installed on the front-end portion of the flexible substrate in a state of being arranged in one direction, and the front-end portion of the flexible substrate is folded between the connection terminal and the A/D conversion chip and is folded between the A/D conversion chip and the digital IC.

As another example of the sensor module according to the present invention, a portion on which the connection terminal is installed of the front-end portion of the flexible substrate is divided into a connection terminal installation area and an electronic component installation area arranged in one direction and is folded in one direction between the connection terminal installation area and the electronic component installation area.

As another example of the sensor module according to the present invention, the sensor element is a magnetic head having a coil and a core for reading data from a magnetic card in which predetermined data is stored.

A method of manufacturing a sensor module according to the present invention is a method of manufacturing a sensor module formed of a flexible substrate extending in one direction, a signal processing device installed on a front-end portion of the flexible substrate, a housing with a predetermined capacity, and a sensor element for converting a measured volume from a measuring target to an analog signal, the signal processing device including a connection terminal connected to the sensor element for receiving the analog signal output from the sensor element, an A/D conversion chip connected to the connection terminal for converting the analog signal received by the connection terminal from the sensor element to a digital signal, and a digital IC connected to the A/D conversion chip for encrypting the digital signal output from the A/D conversion chip, the method of manufacturing the sensor module comprising: an installing step of installing the connection terminal, the A/D conversion chip, and the digital IC on the front-end portion of the flexible substrate; a folding step of folding the front-end portion of the flexible substrate at least into two in one direction; an accommodating step of accommodating the front-end portion of the folded flexible substrate in the housing together with the connection terminal, the A/D conversion chip, and the digital IC; and a fixing step of filling the housing with a solidification substance for fixing the connection terminal, the A/D conversion chip, and the digital IC in the housing together with the front-end portion of the flexible substrate by means of the solidification substance.

As an example of the method of manufacturing the sensor module according to the present invention, the connection terminal, the A/D conversion chip, and the digital IC are installed on the front-end portion of the flexible substrate in a state of being arranged in one direction at the installing step, and the front-end portion of the flexible substrate is folded between the connection terminal and the A/D conversion chip and is folded between the A/D conversion chip and the digital IC at the folding step.

As another example of the method of manufacturing the sensor module according to the present invention, a portion on which the connection terminal is installed of the front-end portion of the flexible substrate is divided into a connection terminal installation area and an electronic component installation area arranged in one direction and is folded in one direction between the connection terminal installation area and the electronic component installation area at the folding step.

As another example of the method of manufacturing the sensor module according to the present invention, the sensor element is a magnetic head having a coil and a core for reading data from a magnetic card in which predetermined data is stored.

Advantageous Effects of Invention

According to the sensor module of the present invention, the signal processing device composing the same includes the digital IC for encrypting the digital signal and the digital IC is fixed in the housing, so that the module itself may encrypt the various data output from the sensor. In the sensor module, the various data output from the sensor is encrypted by the digital IC and the encrypted signal is output from the sensor module to outside, so that even though the third party steals the encrypted data, contents of the data cannot be comprehended unless the data is decrypted, and the security of the data may be ensured. In the sensor module, the front-end portion of the flexible substrate to which the connection terminal, the A/D conversion chip, and the digital IC are attached is accommodated in the housing in a state of being folded at least into two in one direction and the connection terminal, the A/D conversion chip, and the digital IC are fixed to the housing together with the front-end portion of the flexible substrate by means of the solidification substance filled in the housing, so that the connection terminal, the A/D conversion chip, and the digital IC may be integrally fixed in the housing and downsizing of the module including the digital IC for encrypting may be realized. In the sensor module, since the solidification substance should be removed when the front-end portion of the flexible substrate is taken out of the housing, and not only the substrate but also the connection terminal, the A/D conversion chip, and the digital IC are broken when the solidification substance is removed, it is not possible to install the circuit for stealing the data on the substrate and assemble the same again, so that the installation of the circuit for stealing the data on the substrate may be prevented and the security of the data may be certainly ensured.

The sensor module in which the front-end portion of the flexible substrate is folded between the connection terminal and the A/D conversion chip and is folded between the A/D conversion chip and the digital IC is accommodated in the housing in a state in which the front-end portion of the flexible substrate is folded into three in one direction and the connection terminal, the A/D conversion chip, and the digital IC are fixed to the housing together with the front-end portion of the flexible substrate by means of the solidification substance filled in the housing, so that the connection terminal, the A/D conversion chip, and the digital IC may be integrally fixed in the housing so as to be overlapped one another in one direction and the downsizing of the module including the digital IC for encrypting may be realized. By fixing the digital IC in the housing, the sensor module may encrypt the various data output from the sensor by the module itself and the security of the various data output from the sensor may be ensured. In the sensor module, since the connection terminal, the A/D conversion chip, and the digital IC are installed on the front-end portion of the substrate in a state of being arranged in one direction, they may be installed so as to be arranged on one surface of the front-end portion and they may be easily installed on the front-end portion as compared to a case in which the connection terminal, the A/D conversion chip, and the digital IC are installed on both surfaces of the front-end portion.

The sensor module in which the portion on which the connection terminal installed of the front-end portion of the flexible substrate is divided into the connection terminal installation area and the electronic component installation area and is folded in one direction between the connection terminal installation area and the electronic component installation area, the front-end portion of the flexible substrate is accommodated in the housing in a state of being folded into four in one direction and the connection terminal, the electronic component, the A/D conversion chip, and the digital IC are fixed to the housing together with the front-end portion of the flexible substrate by means of the solidification substance filled in the housing, so that the connection terminal, the electronic component, the A/D conversion chip, and the digital IC may be integrally fixed in the housing so as to be overlapped one another in one direction, thereby realizing the downsizing of the module including the digital IC for encrypting. By fixing the digital IC in the housing, the sensor module may encrypt the various data output from the sensor by the module itself and the security of the various data output from the sensor may be ensured. In the sensor module, the connection terminal, the electronic component, the A/D conversion chip, and the digital IC are installed on the front-end portion of the substrate in a state of being arranged in one direction, so that they may be installed so as to be arranged on one surface of the front-end portion and they may be easily installed on the front-end portion as compared to a case in which the connection terminal, the electronic component, the A/D conversion chip, and the digital IC are installed on the both surfaces of the front-end portion.

In the sensor module of which sensor element is the magnetic head having a coil and a core for reading data from the magnetic card in which predetermined data is stored, the various data read from the magnetic card is encrypted by the digital IC and the encrypted signal is output from the sensor module to outside, so that contents of the data of the magnetic card cannot be comprehended unless the third party who steals the encrypted data of the magnetic card decrypts the data, and the security of the data may be ensured. The sensor module may surely prevent unauthorized acquisition of the data of the magnetic card by the third party and unauthorized duplication of the magnetic card by the third party and "spoofing" by the third party may be surely prevented.

According to the method of manufacturing the sensor module of the present invention, the front-end portion of the flexible substrate to which the connection terminal, the A/D conversion chip, and the digital IC are attached is accommodated in the housing in a state of being folded at least into two in one direction and the connection terminal, the A/D conversion chip, and the digital IC are fixed to the housing together with the front-end portion of the flexible substrate by means of the solidification substance filled in the housing, so that the connection terminal, the A/D conversion chip, and the digital IC may be integrally fixed in the housing and a small sensor module including the digital IC for encrypting may be formed. In the method of manufacturing the sensor module, the digital IC is fixed in the housing, so that the sensor module capable of encrypting the various data output from the sensor by itself and ensuring the security of the various data output from the sensor may be manufactured.

In the method of manufacturing the sensor module in which the connection terminal, the A/D conversion chip, and the digital IC are installed on the front-end portion of the flexible substrate in a state of being arranged in one direction at the installing step, and the front-end portion of the flexible substrate is folded between the connection terminal and the A/D conversion chip and is folded between the A/D conversion chip and the digital IC at the folding step, the front-end portion of the flexible substrate is accommodated in the housing in a state of being folded into three in one direction and the connection terminal, the A/D conversion chip, and the digital IC are fixed to the housing together with the front-end portion of the flexible substrate by means of the solidification substance filled in the housing, so that the connection terminal, the A/D conversion chip, and the digital IC may be integrally fixed in the housing so as to be overlapped one another in one direction and the small sensor module including the digital IC for encrypting may be formed. In the method of manufacturing the sensor module, the digital IC is fixed in the housing, so that the sensor module capable of encrypting the various data output from the sensor by itself and ensuring the security of the various data output from the sensor may be manufactured. In the method of manufacturing the sensor module, the connection terminal, the A/D conversion chip, and the digital IC are installed on the front-end portion of the substrate in a state of being arranged in one direction, so that they may be installed so as to be arranged on one surface of the front-end portion and they may be easily installed on the front-end portion as compared to a case in which the connection terminal, the A/D conversion chip, and the digital IC are installed on the both surfaces of the front-end portion.

In the method of manufacturing the sensor module in which the portion on which the connection terminal is installed of the front-end portion of the flexible substrate is divided into the connection terminal installation area and the electronic component installation area arranged in one direction and is folded in one direction between the connection terminal installation area and the electronic component installation area at the folding step, the front-end portion of the flexible substrate is accommodated in the housing in a state of being folded into four in one direction and the connection terminal, the electronic component, the A/D conversion chip, and the digital IC are fixed to the housing together with the front-end portion of the flexible substrate by means of the solidification substance filled in the housing, so that the connection terminal, the electronic component, the A/D conversion chip, and the digital IC may be integrally fixed in the housing so as to be overlapped one another in one direction and the small sensor module including the digital IC for encrypting may be formed. In the method of manufacturing the sensor module, the digital IC is fixed in the housing, so that the sensor module capable of encrypting the various data output from the sensor by itself and ensuring the security of the various data output from the sensor may be manufactured. In the method of manufacturing the sensor module, the connection terminal, the electronic component, the A/D conversion chip, and the digital IC are installed on the front-end portion of the substrate in a state of being arranged in one direction, so that they may be installed so as to be arranged on one surface of the front-end portion and they may be easily installed on the front-end portion as compared to a case in which the connection terminal, the electronic component, the A/D conversion chip, and the digital IC are installed on the both surfaces of the front-end portion.

In the method of manufacturing the sensor module of which sensor element is the magnetic head having the coil and the core for reading data from the magnetic card in which the predetermined data is stored, the front-end portion of the flexible substrate to which the connection terminal, the A/D conversion chip, and the digital IC are attached is accommodated in the housing on which the magnetic head is installed in a state of being folded at least into two in one direction and the connection terminal, the A/D conversion chip, and the digital IC are fixed to the housing together with the front-end portion of the flexible substrate by means of the solidification substance filled in the housing, so that the sensor module capable of encrypting the various data output from the magnetic head by itself and certainly ensuring the security of the various data of the magnetic card may be formed.

BRIEF DESCRIPTION OF THE DRAWINGS

FIG. 33 is a view illustrating another example of the generation of the key used for encryption and decryption.

BEST MODE FOR CARRYING OUT THE INVENTION

Figure 1:
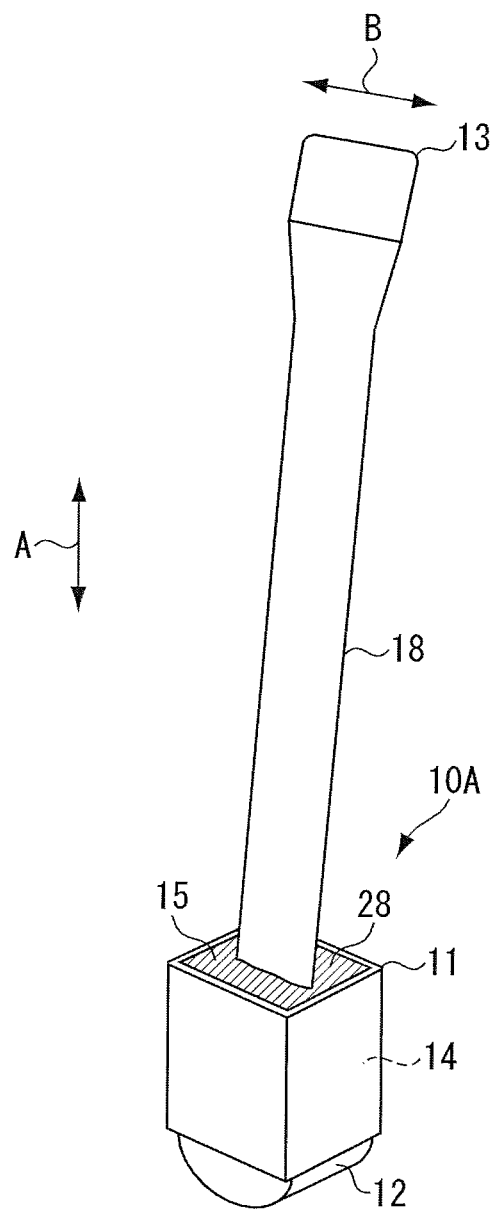
FIG. 1 is a perspective view of a sensor module illustrated as an example.
Figure 2:
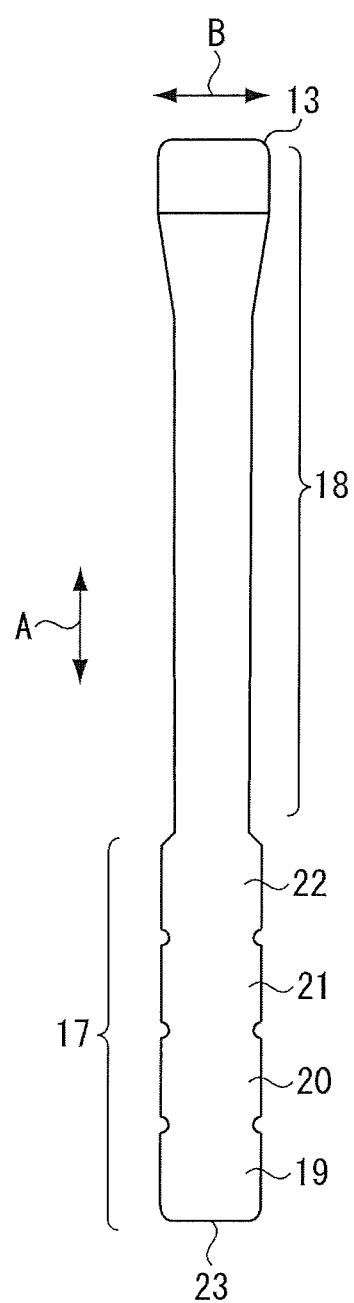
FIG. 2 is a planar view of a flexible substrate illustrated as an example.
Figure 3:
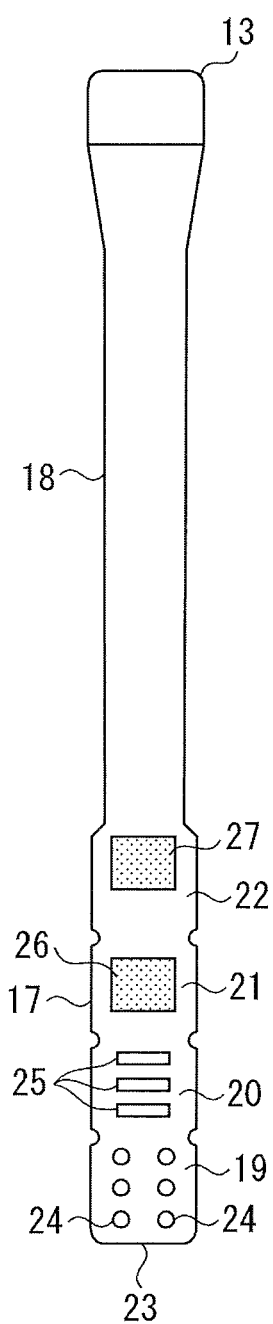
FIG. 3 is a planar view of the flexible substrate on which a signal processing device is installed.
Figure 4:
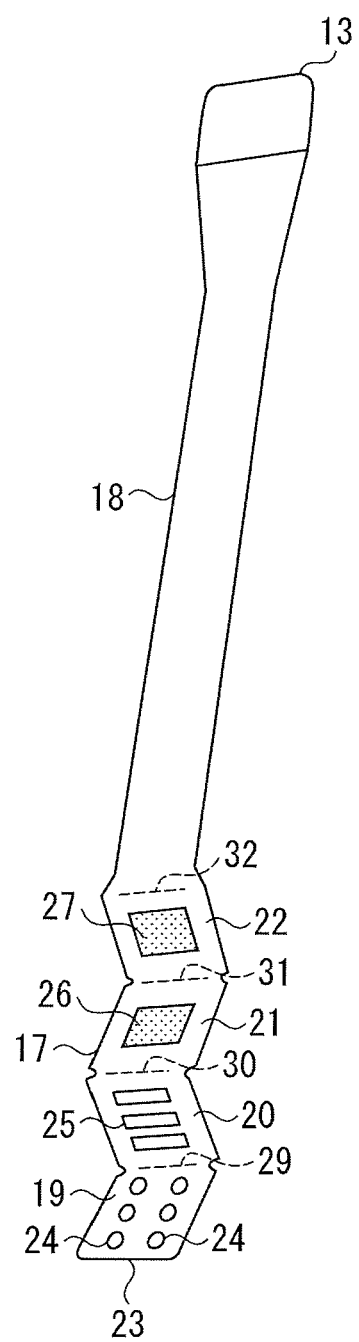
FIG. 4 is a perspective view of the flexible substrate illustrated in a state of being folded.
Figure 5:
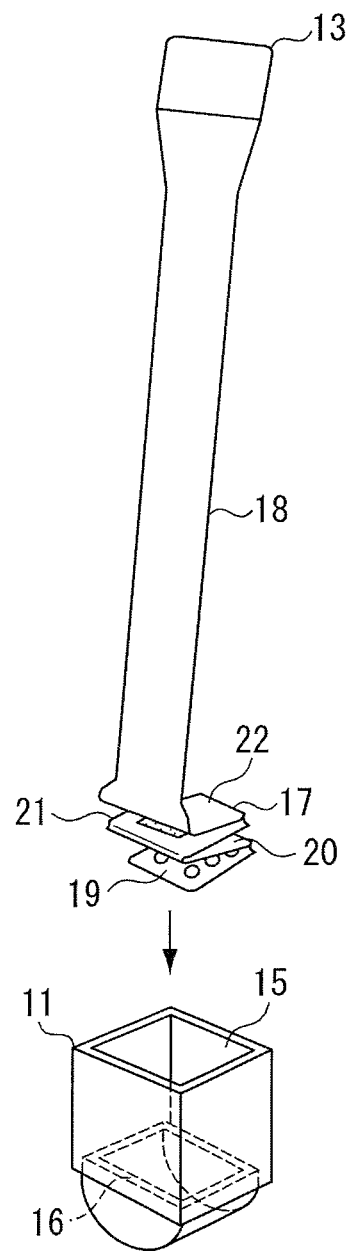
FIG. 5 is a perspective view of a housing and the flexible substrate.
Figure 6:
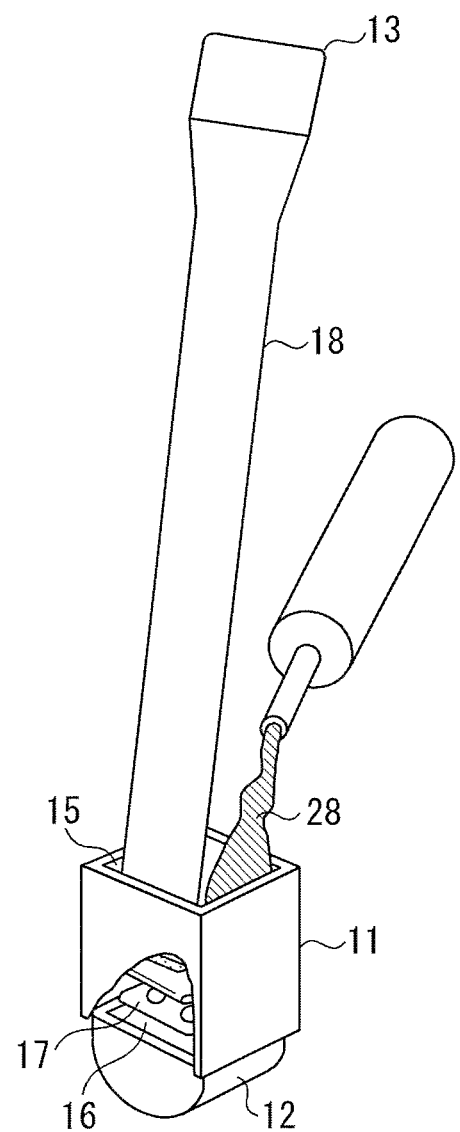
FIG. 6 is a perspective view of the sensor module in a state in which the housing is being filled with epoxy resin.

A sensor module according to the present invention and a method of manufacturing the same are hereinafter described in detail with reference to the attached drawings. FIG. 1 is a perspective view of a sensor module 10A illustrated as an example and FIG. 2 is a planar view of a flexible substrate 13 illustrated as an example. FIG. 3 is a planar view of the flexible substrate 13 on which a signal processing device 14 is installed and FIG. 4 is a perspective view of the flexible substrate 13 illustrated in a folded state. FIG. 5 is a perspective view of a housing 11 and the flexible substrate 13 and FIG. 6 is a perspective view of the sensor module 10A in a state in which the housing 11 is being filled with epoxy resin 28 (solidification substance). In FIGS. 1 and 2, a longitudinal direction is indicated by an arrow A and a transverse direction is indicated by an arrow B.

Meanwhile, although the sensor module 10A is described by taking a magnetic head 12 as an example of a sensor element, the sensor element is not especially limited and any other sensor element may be used. The sensor element includes a strain gauge, an acceleration sensor, a resolver, a thermocouple, a platinum wire sensor, a thermister, a semiconductor temperature sensor, thermography, a ceramics sensor, a polymer membrane sensor, a pressure-sensitive conductive rubber, a pressure-sensitive semiconductor, a pressure-sensitive film, a force sensor, a CdS cell, a photo diode, a phototube, a pyroelectric sensor, a CCD sensor, a PSD sensor, a microphone, an ultrasonic sensor, a semiconductor gas sensor, an ion electrode sensor, a Hall element and the like.

The sensor module 10A is composed of the housing 11 with a predetermined capacity, the magnetic head 12 (sensor element), the flexible substrate 13 (flexible printed substrate) extending in the longitudinal direction (one direction), and the signal processing device 14. The housing 11 is formed of metal or synthetic resin and the inside thereof has a hollow shape. The housing 11 has an upper-end opening 15 and a lower-end opening 16. The magnetic head 12 converts various data (measured volume) stored in a magnetic layer of a magnetic card (measuring target) to an electric signal (analog signal). The magnetic head 12 is such that an outer peripheral surface thereof is covered with the housing 11 and a part thereof is exposed from the lower-end opening 16 of the housing 11, as illustrated in FIG. 1. Although not illustrated, the magnetic head 12 has a coil for converting the various data stored in the magnetic card to the analog signal (electric signal) and a core to which the coil is attached.

The flexible substrate 13 has a front-end portion 17 and a rear-end portion 18 extending from the front-end portion 17 in the longitudinal direction. The flexible substrate 13 is such that the front-end portion 17 is accommodated in the housing 11 and the rear-end portion 18 is exposed from the upper-end opening 15 of the housing 11. Although not illustrated, the flexible substrate 13 is formed of a film-shaped insulator with a thickness dimension of 12 μm to 50 μm, a bonding layer formed on the film-shaped insulator, and conductive foil formed on the bonding layer with the thickness dimension of 12 μm to 50 μm. The flexible substrate 13 has excellent flexibility to be freely deformed such as to be folded and maintains electric characteristics thereof also after being deformed. A polyimide membrane and a photo solder resist membrane are used as the insulator and copper is used as the conductive foil. The conductive foil extends from the front-end portion 17 toward the rear-end portion 18 in the longitudinal direction and is attached to the end portions 17 and 18.

The front-end portion 17 of the flexible substrate 13 is divided into a connection terminal installation area 19 (first portion), an electronic component installation area 20 (second portion), an A/D conversion chip installation area 21 (third portion), and a microprocessor installation area 22 (digital IC installation area) (fourth portion). The areas 19 to 22 are arranged from a front end 23 of the front-end portion 17 toward the read-end portion 18 in the longitudinal direction in an order of the connection terminal installation area 19, the electronic component installation area 20, the A/D conversion chip installation area 21, and the microprocessor installation area 22.

The signal processing device 14 is attached to the front-end portion 17 of the flexible substrate 13. The signal processing device 14 is formed of a connection terminal 24 for receiving the analog signal output from the magnetic head 12, a resistive element 25 (electronic component) for adjusting impedance of the analog signal, an A/D conversion chip 26 for converting the analog signal to a digital signal, and a microprocessor 27 (digital IC) for encrypting the digital signal output from the A/D conversion chip 26. On the front-end portion 17 of the flexible substrate 13, the connection terminal 24, the resistive element 25, the A/D conversion chip 26, and the microprocessor 27 are arranged in this order in the longitudinal direction from the front end 23 thereof toward the rear-end portion 18.

The connection terminal 24 is installed in the connection terminal installation area 19 to be connected to the magnetic head 12. The resistive element 25 is installed in the electronic component installation area 20 to be connected to the connection terminal 24. The A/D conversion chip 26 is installed in the A/D conversion chip installation area 21 to be connected to the resistive element 25. The microprocessor 27 is installed in the microprocessor installation area 22 to be connected to the A/D conversion chip 26.

The microprocessor 27 has a central processing unit and memory (flash memory or EEROM). The central processing unit of the processor 27 is formed of an arithmetic unit and a controlling unit. Meanwhile, any digital IC out of a gate array, a field programmable gate array, and dedicated hardware may be used in place of the microprocessor 27.

In the sensor module 10A, the front-end portion 17 of the flexible substrate 13 to which the connection terminal 24, the resistive element 25, the A/D conversion chip 26, and the microprocessor 27 are attached is accommodated in the housing 11 in a state of being folded into four in one longitudinal direction. Specifically, the front-end portion 17 of the flexible substrate 13 is folded in the longitudinal direction between the connection terminal installation area 19 and the electronic component installation area 20 and is folded in the longitudinal direction between the electronic component installation area 20 and the A/D conversion chip installation area 21. Further, this is folded in the longitudinal direction between the A/D conversion chip installation area 21 and the microprocessor installation area 22 and is folded in the longitudinal direction between the microprocessor installation area 22 and the rear-end portion 18. In the sensor module 10A, the connection terminal 24, the resistive element 25, the A/D conversion chip 26, and the microprocessor 27 are fixed to the housing 11 together with the front-end portion 17 of the flexible substrate 13 by means of the epoxy resin 28 filled in the housing 11.

In the sensor module 10A, the front-end portion 17 of the flexible substrate 13 is accommodated in the housing 11 in a state of being folded into four in the longitudinal direction and the connection terminal 24, the resistive element 25, the A/D conversion chip 26, and the microprocessor 27 are fixed to the housing 11 together with the front-end portion 17 of the flexible substrate 13 by means of the epoxy resin 28 filled in the housing 11, so that the connection terminal 24, the resistive element 25, the A/D conversion chip 26, and the microprocessor 27 may be integrally fixed in the housing so as to be overlapped one another in the longitudinal direction, thereby realizing downsizing of the module 10A including the microprocessor 27 for encrypting. By fixing the microprocessor 27 in the housing 11, the sensor module 10A may encrypt the various data output from the magnetic head 12 by the module 10A itself and may ensure security of the various data output from the magnetic head 12.

An example of a method of manufacturing the sensor module 10A is described as follows. Meanwhile, suppose that the magnetic head 12 is already installed on the housing 11. The method of manufacturing the sensor module 10A includes an installing step, a folding step, an accommodating step, and a fixing step. The steps are performed in the order of the installing step, the folding step, the accommodating step, and the fixing step. In the installing step, as illustrated in FIG. 3, the connection terminal 24, the resistive element 25, the A/D conversion chip 26, and the microprocessor 27 are attached to one surface of the front-end portion 17 of the flexible substrate 13 in a state of being arranged in the longitudinal direction.

In the installing step, the connection terminal 24 is installed in the connection terminal installation area 19 and the resistive element 25 is installed in the electronic component installation area 20 to be connected to the connection terminal 24 through the conductive foil. The A/D conversion chip 26 is installed in the A/D conversion chip installation area 21 to be connected to the resistive element 25 through the conductive foil and the microprocessor 27 is installed in the microprocessor installation area 22 to be connected to the A/D conversion chip 26 through the conductive foil. Although an attaching order of them is not especially limited, they are arranged in the order of the connection terminal 24, the resistive element 25, the A/D conversion chip 26, and the microprocessor 27 from the front end 23 of the front-end portion 17 toward the rear-end portion 18 as described above in a state of being attached.

In the folding step, as illustrated in FIG. 4, the front-end portion 17 of the flexible substrate 13 is folded into four in the longitudinal direction. In the folding step, the front-end portion 17 of the flexible substrate 13 is folded in the longitudinal direction along a first folding line 29 extending in the transverse direction between the connection terminal installation area 19 and the electronic component installation area 20 and is folded in the longitudinal direction along a second folding line 30 extending in the transverse direction between the electronic component installation area 20 and the A/D conversion chip installation area 21. Further, this is folded in the longitudinal direction along a third folding line 31 extending in the transverse direction between the A/D conversion chip installation area 21 and the microprocessor installation area 22 and is folded in the longitudinal direction along a fourth folding line 32 extending in the transverse direction between the microprocessor installation area 22 and the rear-end portion 18. In the folded front-end portion 13, the connection terminal installation area 19 and the electronic component installation area 20 are opposed to each other and the A/D conversion chip installation area 21 and the microprocessor installation area 22 are opposed to each other.

In the accommodating step, as illustrated in FIG. 5, the front-end portion 17 of the flexible substrate 13 folded into four is accommodated in the housing 11 from the upper-end opening 15 of the housing 11. When the front-end portion 17 is accommodated in the housing 11, the connection terminal 23 abuts the magnetic head 12 in the housing 11 and the connection terminal 23 and the magnetic head 12 are connected to each other. The rear-end portion 18 of the flexible substrate 13 is exposed to the outside of the housing 11. In the fixing step, as illustrated in FIG. 6, the housing 11 is filled with the epoxy resin 28 and the connection terminal 24, the resistive element 25, the A/D conversion chip 26, and the microprocessor 27 are fixed in the housing 11 together with the front-end portion 17 of the flexible substrate 13 by means of the epoxy resin 28.

The method of manufacturing the sensor module 10A is such that the front-end portion 17 of the flexible substrate 13 is accommodated in the housing 11 in a state of being folded into four in the longitudinal direction and the connection terminal 24, the resistive element 25, the A/D conversion chip 26, and the microprocessor 27 are fixed to the housing 11 together with the front-end portion 17 of the flexible substrate 13 by means of the epoxy resin 28 filled in the housing 11, so that the connection terminal 24, the resistive element 25, the A/D conversion chip 26, and the microprocessor 27 may be integrally fixed in the housing 11 so as to be overlapped one another in the longitudinal direction, thereby forming a small sensor module 10A including the microprocessor 27 for encrypting.

Since the microprocessor 27 is fixed in the housing 11 in the method of manufacturing, the sensor module 10A capable of encrypting the various data output from the magnetic head 12 by itself and ensuring the security of the various data output from the magnetic head 12 may be manufactured. Since the connection terminal 24, the resistive element 25, the A/D conversion chip 26, and the microprocessor 27 are installed on the front-end portion 17 of the flexible substrate 13 in a state of being arranged in the longitudinal direction in the method of manufacturing, they may be installed so as to be arranged on one surface of the front-end portion 17 and they may be easily installed on the front-end portion 17 as compared to a case in which the connection terminal 24, the resistive element 25, the A/D conversion chip 26, and the microprocessor 27 are installed on both surfaces of the front-end portion 17.

Figure 7:
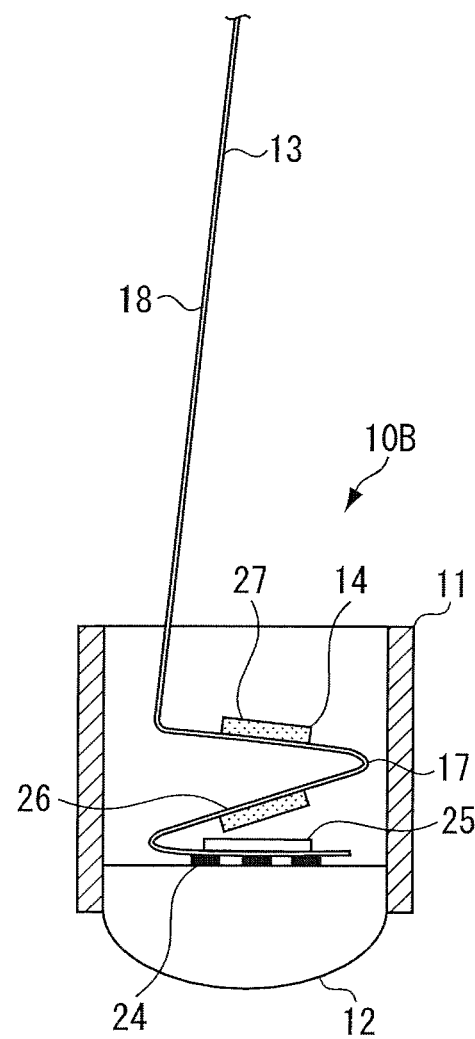
FIG. 7 is a perspective view of the sensor module in a mode different from that in FIG. 1.
Figure 8:
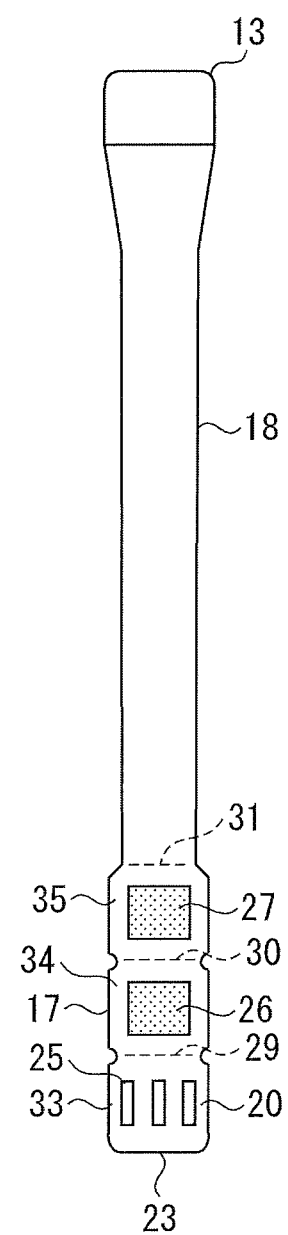
FIG. 8 is a planar view of the flexible substrate.
Figure 9:
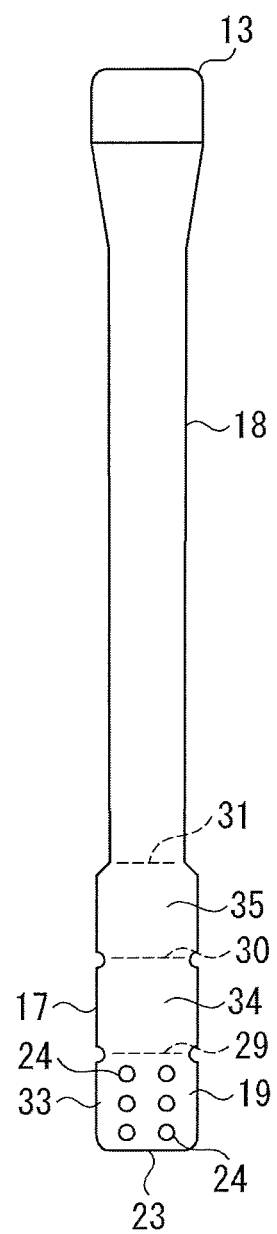
FIG. 9 is a planar view of the flexible substrate.

FIG. 7 is a perspective view of a sensor module 10B in a mode different from that in FIG. 1 and FIGS. 8 and 9 are planar views of the flexible substrate 13. In FIG. 7, the epoxy resin 28 is not illustrated. FIG. 8 illustrates one surface of the flexible substrate 13 and FIG. 9 illustrates the other surface of the flexible substrate 13. The sensor module 10B is composed of the housing 11 with a predetermined capacity, the magnetic head 12, the flexible substrate 13 (flexible printed substrate) extending in the longitudinal direction (one direction), and the signal processing device 14 installed on the front-end portion 17 of the flexible substrate 13. The housing 11, the magnetic head 12, and the flexible substrate 13 are identical to those in FIG. 1.

The front-end portion 17 of the flexible substrate 13 is divided into three such as first to third portions 33 to 35 from the front end 23 thereof toward the rear-end portion 18. The first portion 33 doubles as the connection terminal installation area 19 and the electronic component installation area 20. In the first portion 33, the connection terminal installation area 19 is formed on the other surface of the portion 33 and the electronic component installation area 20 is formed on one surface of the portion 33. The second portion 34 becomes the A/D conversion chip installation area 21. The A/D conversion chip installation area 21 is formed on one surface of the second portion 34. The third portion 35 becomes the microprocessor installation area 22 (digital IC installation area). The microprocessor installation area 22 is formed on one surface of the third portion 35. The areas 19 to 22 are arranged in the longitudinal direction in the order of the connection terminal installation area 19 and the electronic component installation area 20, the A/D conversion chip installation area 21, and the microprocessor installation area 22 from the front end 23 of the front-end portion 17 toward the rear-end portion 18.

The signal processing device 14 is formed of the connection terminal 24 for receiving the analog signal output from the magnetic head 12, the resistive element 25 (electronic component) for adjusting the impedance of the analog signal, the A/D conversion chip 26 for converting the analog signal to the digital signal, and the microprocessor 27 (digital IC) for encrypting the digital signal output from the A/D conversion chip 26. On the front-end portion 17 of the flexible substrate 13, the connection terminal 24 and the resistive element 25, the A/D conversion chip 26, and the microprocessor 27 are arranged in this order in the longitudinal direction from the front end 23 thereof toward the rear-end portion 18. The connection terminal 24 is installed in the connection terminal installation area 19 to be connected to the magnetic head 12. The resistive element 25 is installed in the electronic component installation area 20 to be connected to the connection terminal 24. The A/D conversion chip 26 is installed in the A/D conversion chip installation area 21 to be connected to the resistive element 25. The microprocessor 27 is installed in the microprocessor installation area 22 to be connected to the A/D conversion chip 26.

In the sensor module 10B, the front-end portion 17 of the flexible substrate 13 to which the connection terminal 24, the resistive element 25, the A/D conversion chip 26, and the microprocessor 27 are attached is accommodated in the housing 11 in a state of being folded into three in the longitudinal direction. Specifically, the front-end portion 17 of the flexible substrate 13 is folded in the longitudinal direction between the first portion 33 and the second portion 34, folded in the longitudinal direction between the second portion 34 and the third portion 35, and further folded in the longitudinal direction between the third portion 35 and the rear-end portion 18. In the sensor module 10B, the connection terminal 24, the resistive element 25, the A/D conversion chip 26, and the microprocessor 27 are fixed to the housing 11 together with the front-end portion 17 of the flexible substrate 13 by means of the epoxy resin 28 filled in the housing 11.

In the sensor module 10B, the front-end portion 17 of the flexible substrate 13 is accommodated in the housing 11 in a state of being folded into three in the longitudinal direction and the connection terminal 24, the resistive element 25, the A/D conversion chip 26, and the microprocessor 27 are fixed to the housing 11 together with the front-end portion 17 of the flexible substrate 13 by means of the epoxy resin 28 filled in the housing 11, so that the connection terminal 24, the resistive element 25, the A/D conversion chip 26, and the microprocessor 27 may be integrally fixed in the housing 11 so as to be overlapped one another in the longitudinal direction, thereby realizing downsizing of the module 10B including the microprocessor 27 for encrypting. By fixing the microprocessor 27 in the housing 11, the sensor module 10B may encrypt the various data output from the magnetic head 12 by the module 10A itself and may ensure the security of the various data output from the magnetic head 12.

An example of a method of manufacturing the sensor module 10B is described as follows. Meanwhile, suppose that the magnetic head 12 is already installed on the housing 11. The method of manufacturing the sensor module 10B includes an installing step, a folding step, an accommodating step, and a fixing step as in the method of manufacturing the sensor module 10A.

In the installing step, the connection terminal 24 is installed in the connection terminal installation area 19 formed on the other surface of the first portion 33 and the resistive element 25 is installed in the electronic component installation area 20 formed on one surface of the first portion 33 to be connected to the connection terminal 24 through the conductive foil. The A/D conversion chip 26 is installed in the A/D conversion chip installation area 21 formed on one surface of the second portion 34 to be connected to the resistive element 25 through the conductive foil and the microprocessor 27 is installed in the microprocessor installation area 22 formed on one surface of the third portion 35 to be connected to the A/D conversion chip 26 through the conductive foil.

In the folding step, the front-end portion 17 of the flexible substrate 13 is folded into three in the longitudinal direction. In the folding step, the front-end portion 17 of the flexible substrate 13 is folded in the longitudinal direction along the first folding line 29 extending in the transverse direction between the first portion 33 and the second portion 32 and is folded in the longitudinal direction along the second folding line 30 extending in the transverse direction between the second portion 34 and the third portion 35. Further, this is folded in the longitudinal direction along the third folding line 31 extending in the transverse direction between the third portion 35 and the rear-end portion 18. In the folded front-end portion 13, the electronic component installation area 20 and the A/D conversion chip installation area 21 are opposed to each other.

In the accommodating step, the front-end portion 17 of the flexible substrate 13 folded into three is accommodated in the housing 11 from the upper-end opening 15 of the housing 11. When the front-end portion 17 is accommodated in the housing 11, the connection terminal 23 abuts the magnetic head 12 in the housing 11 and the connection terminal 23 and the magnetic head 12 are connected to each other. The rear-end portion 18 of the flexible substrate 13 is exposed to the outside of the housing 11. In the fixing step, the housing 11 is filled with the epoxy resin 28 and the connection terminal 24, the resistive element 25, the A/D conversion chip 26, and the microprocessor 27 are fixed in the housing 11 together with the front-end portion 17 of the flexible substrate 13 by means of the epoxy resin 28.

The method of manufacturing the sensor module 10B is such that the front-end portion 17 of the flexible substrate 13 is accommodated in the housing 11 in a state of being folded into three in the longitudinal direction and the connecting terminal 24, the resistive element 25, the A/D conversion chip 26, and the microprocessor 27 are fixed to the housing 11 by means of the epoxy resin 28 filled in the housing 11 together with the front-end portion 17 of the flexible substrate 13, so that the connection terminal 24, the resistive element 25, the A/D conversion chip 26, and the microprocessor 27 may be integrally fixed in the housing 11 so as to be overlapped one another in the longitudinal direction, thereby forming a small sensor module 10B including the microprocessor 27 for encrypting. Since the microprocessor 27 is fixed in the housing 11 in the method of manufacturing, the sensor module 10B capable of encrypting the various data output from the magnetic head 12 by itself and ensuring the security of the various data output from the magnetic head 12 may be manufactured.

The resistive element 25 may be omitted from the sensor module 10B. In this case, the connection terminal installation area 19 is formed on one surface of the first portion 33, the A/D conversion chip installation area 21 is formed on one surface of the second portion 34, and the microprocessor installation area 22 (digital IC installation area) is formed on one surface of the third portion 35. The areas 19, 21, and 22 are arranged in the longitudinal direction in the order of the connection terminal installation area 19, the A/D conversion chip installation area 21, and the microprocessor installation area 22 from the front end 23 of the front-end portion 17 toward the rear-end portion 18.

Figure 10:
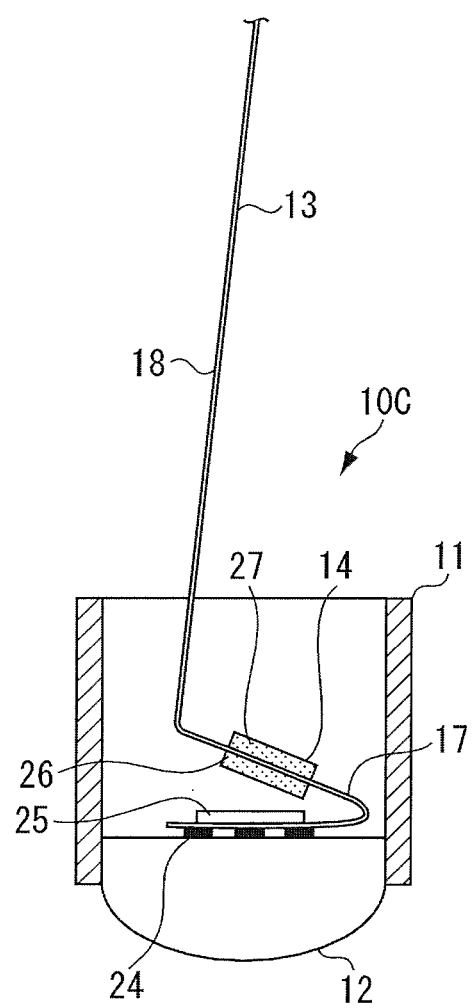
FIG. 10 is a perspective view of the sensor module in a mode different from that in FIGS. 1 and 7.
Figure 11:
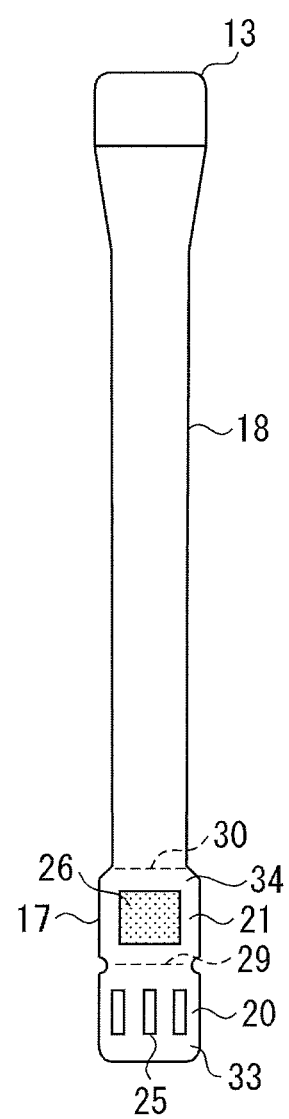
FIG. 11 is a planar view of the flexible substrate.
Figure 12:
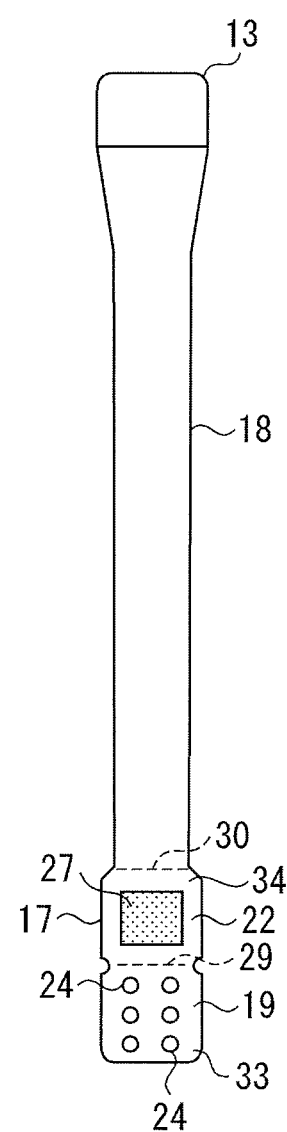
FIG. 12 is a planar view of the flexible substrate.

FIG. 10 is a perspective view of a sensor module 10C in a mode different from that in FIGS. 1 and 7 and FIGS. 11 and 12 are planar views of the flexible substrate 13. The epoxy resin 28 is not illustrated in FIG. 10. FIG. 11 illustrates one surface of the flexible substrate 13 and FIG. 12 illustrates the other surface of the flexible substrate 13. The sensor module 10C is composed of the housing 11 with a predetermined capacity, the magnetic head 12, the flexible substrate 13 (flexible printed substrate) extending in the longitudinal direction (one direction), and the signal processing device 14 installed on the front-end portion 17 of the flexible substrate 13. The housing 11, the magnetic head 12, and the flexible substrate 13 are identical to those in FIG. 1.

The front-end portion 17 of the flexible substrate 13 is divided into two such as the first and second portions 33 and 34 from the front end 23 thereof toward the rear-end portion 18. The first portion 33 doubles as the connection terminal installation area 19 and the electronic component installation area 20. In the first portion 33, the connection terminal installation area 19 is formed on one surface of the portion 33 and the electronic component installation area 20 is formed on the other surface of the portion 33. The second portion 34 doubles as the A/D conversion chip installation area 21 and the microprocessor installation area 22 (digital IC installation area). In the second portion 34, the A/D conversion chip installation area 21 is formed on the other surface of the portion 34 and the microprocessor installation area 22 is formed on one surface of the portion 34. The areas 19 to 22 are arranged in the longitudinal direction in the order of the connection terminal installation area 19 and the electronic component installation area 20, and the A/D conversion chip installation area 21 and the microprocessor installation area 22 from the front end 23 of the front-end portion 17 toward the rear-end portion 18.

The signal processing device 14 is formed of the connection terminal 24 for receiving the analog signal output from the magnetic head 12, the resistive element 25 (electronic component) for adjusting the impedance of the analog signal, the A/D conversion chip 26 for converting the analog signal to the digital signal, and the microprocessor 27 (digital IC) for encrypting the digital signal output from the A/D conversion chip 26. On the front-end portion 17 of the flexible substrate 13, the connection terminal 24 and the resistive element 25, and the A/D conversion chip 26 and the microprocessor 27 are arranged in this order in the longitudinal direction from the front end 23 thereof toward the rear-end portion 18.

The connection terminal 24 is installed in the connection terminal installation area 19 to be connected to the magnetic head 12. The resistive element 25 is installed in the electronic component installation area 20 to be connected to the connection terminal 24. The A/D conversion chip 26 is installed in the A/D conversion chip installation area 21 to be connected to the resistive element 25. The microprocessor 27 is installed in the microprocessor installation area 22 to be connected to the A/D conversion chip 26.

In the sensor module 10C, the front-end portion 17 of the flexible substrate 13 to which the connection terminal 24, the resistive element 25, the A/D conversion chip 26, and the microprocessor 27 are attached is accommodated in the housing 11 in a state of being folded into two in the longitudinal direction. Specifically, the front-end portion 17 of the flexible substrate 13 is folded in the longitudinal direction between the first portion 33 and the second portion 34 and is folded in the longitudinal direction between the second portion 34 and the rear-end portion 18. In the sensor module 10C, the connection terminal 24, the resistive element 25, the A/D conversion chip 26, and the microprocessor 27 are fixed to the housing 11 together with the front-end portion 17 of the flexible substrate 13 by means of the epoxy resin 28 filled in the housing 11.

In the sensor module 10C, the front-end portion 17 of the flexible substrate 13 is accommodated in the housing 11 in a state of being folded into two in the longitudinal direction and the connection terminal 24, the resistive element 25, the A/D conversion chip 26, and the microprocessor 27 are fixed to the housing 11 together with the front-end portion 17 of the flexible substrate 13 by means of the epoxy resin 28 filled in the housing 11, so that the connection terminal 24, the resistive element 25, the A/D conversion chip 26, and the microprocessor 27 may be integrally fixed in the housing 11 so as to be overlapped one another in the longitudinal direction, thereby realizing downsizing of the module 10C including the microprocessor 27 for encrypting. By fixing the microprocessor 27 in the housing 11, the sensor module 10C may encrypt the various data output from the magnetic head 12 by the module 10A itself and may ensure the security of the various data output from the magnetic head 12.

An example of a method of manufacturing the sensor module 10C is described as follows. Meanwhile, suppose that the magnetic head 12 is already installed on the housing 11. The method of manufacturing the sensor module 10C includes an installing step, a folding step, an accommodating step, and a fixing step as in the method of manufacturing the sensor module 10A.

In the installing step, the connection terminal 24 is installed in the connection terminal installation area 19 formed on one surface of the first portion 33 and the resistive element 25 is installed in the electronic component installation area 20 formed on the other surface of the first portion 33 to be connected to the connection terminal 24 through the conductive foil. The A/D conversion chip 26 is installed in the A/D conversion chip installation area 21 formed on the other surface of the second portion 34 to be connected to the resistive element 25 through the conductive foil and the microprocessor 27 is installed in the microprocessor installation area 22 formed on one surface of the second portion 34 to be connected to the A/D conversion chip 26 through the conductive foil.

In the folding step, the front-end portion 17 of the flexible substrate 13 is folded into two in the longitudinal direction. In the folding step, the front-end portion 17 of the flexible substrate 13 is folded in the longitudinal direction along the first folding line 29 extending in the transverse direction between the first portion 33 and the second portion 34 and is folded in the longitudinal direction along the second folding line 30 extending in the transverse direction between the second portion 34 and the rear-end portion 18. In the folded front-end portion 13, the electronic component installation area 20 and the A/D conversion chip installation area 21 are opposed to each other.

In the accommodating step, the front-end portion 17 of the flexible substrate 13 folded into two is accommodated in the housing 11. When the front-end portion 17 is accommodated in the housing 11, the connection terminal 23 abuts the magnetic head 12 in the housing 11 and the connection terminal 23 and the magnetic head 12 are connected to each other. The rear-end portion 18 of the flexible substrate 13 is exposed to the outside of the housing 11. In the fixing step, the housing 11 is filled with the epoxy resin 28 and the connection terminal 24, the resistive element 25, the A/D conversion chip 26, and the microprocessor 27 are fixed in the housing 11 together with the front-end portion 17 of the flexible substrate 13 by means of the epoxy resin 28.

The method of manufacturing the sensor module 10C is such that the front-end portion 17 of the flexible substrate 13 is accommodated in the housing 11 in a state of being folded into two in the longitudinal direction and the connection terminal 24, the resistive element 25, the A/D conversion chip 26, and the microprocessor 27 are fixed to the housing 11 together with the front-end portion 17 of the flexible substrate 13 by means of the epoxy resin 28 filled in the housing 11, so that the connection terminal 24, the resistive element 25, the A/D conversion chip 26, and the microprocessor 27 may be integrally fixed in the housing 11 so as to be overlapped one another in the longitudinal direction, thereby forming a small sensor module 10C including the microprocessor 27 for encrypting. Since the microprocessor 27 is fixed in the housing 11 in the method of manufacturing, the sensor module 10C capable of encrypting the various data output from the magnetic head 12 by itself and ensuring the security of the various data output from the magnetic head 12 may be manufactured.

The resistive element 25 may be omitted from the sensor module 10C. In this case, the connection terminal installation area 19 is formed on one surface of the first portion 33, the microprocessor installation area 22 is formed on one surface of the second portion 34, and the A/D conversion chip installation area 21 is formed on one surface of the second portion 34. The areas 19, 21, and 22 are arranged in the longitudinal direction in the order of the connection terminal installation area 19, and the A/D conversion chip installation area 21 and the microprocessor installation area 22 from the front end 23 of the front-end portion 17 toward the rear-end portion 18.

Figure 13:
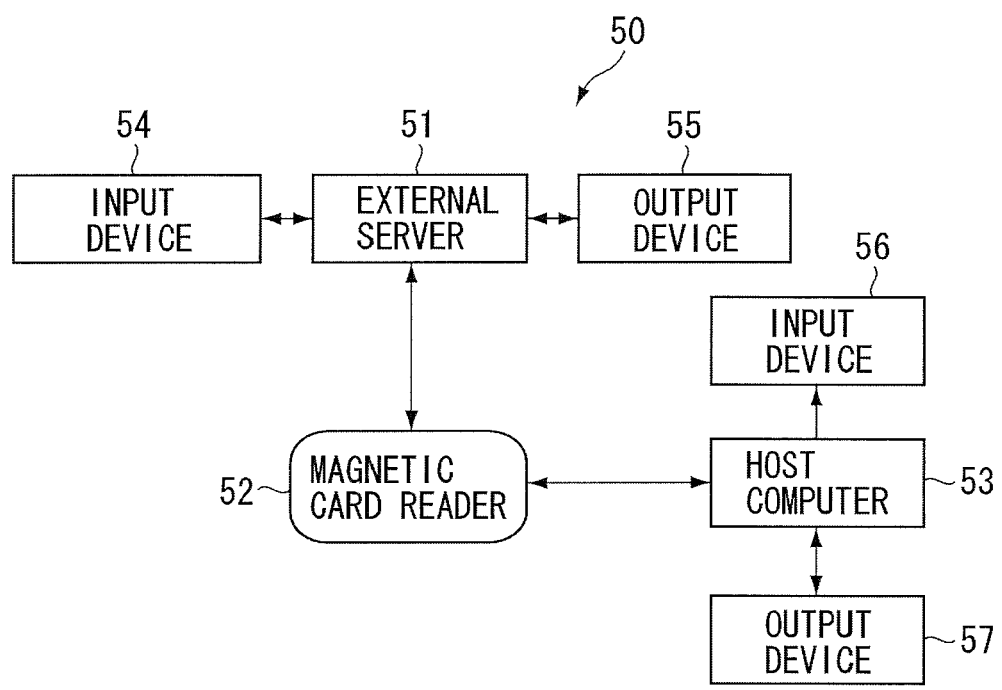
FIG. 13 is a hardware configuration diagram of a magnetic card reading system illustrated as an example of using the sensor module.

FIG. 13 is a hardware configuration diagram of a magnetic card reading system 50 illustrated as an example of using any one of the sensor modules 10A to 10C. The magnetic card reading system 50 is formed of an external server 51, a magnetic card reader 52 for reading card data (various data) stored in the magnetic card, and a host computer 53. In the system 50, the server 51 and the card reader 52 are connected to each other through an interface (wired or wireless) and the card reader 52 and the computer 53 are connected to each other through the interface (wired or wireless).

The card data includes a card number, a security code, user ID, a password, individual information of a card holder (postal code, address or location, name or trade name, date of birth, family configuration, annual salary, place of work, telephone number, facsimile number, mail address, URL and the like), corporate body information of the card holder (postal code, address, trade name, date of foundation, various pieces of management information, customer information, telephone number, facsimile number, mail address, URL and the like), contents of business and the like.

The external server 51 is a computer having the central processing unit (CPU or MPU) and the memory (high-capacity hard disk) and is provided with a DNS server function. The URL of the card reader 52 is stored in the memory. The central processing unit of the server 51 is formed of the arithmetic unit and the controlling unit. An inputting device 54 such as a keyboard and a mouse, an outputting device 55 such as a display and a printer are connected to the server 51 through the interface. The central processing unit of the server 51 starts an application stored in the memory based on control by an operating system to execute following respective means according to the started application.

The central processing unit of the external server 51 executes firmware encryption means for encrypting predetermined firmware using a key stored in the memory and executes algorithm encryption means for encrypting a predetermined encryption algorithm using the key stored in the memory. The central processing unit of the server 51 executes accessing means for accessing a controller to be described later of the card reader 52 via the Internet and executes mutual authentication means for mutually authenticating with the sensor modules 10A to 10C.

The central processing unit of the external server 51 executes firmware first downloading means for downloading unencrypted firmware or encrypted firmware to the sensor modules 10A to 10C and executes firmware second downloading means for downloading unencrypted new firmware (upgraded firmware) or encrypted new firmware (upgraded firmware) to the sensor modules 10A to 10C. The central processing unit of the server 51 executes algorithm first downloading means for downloading unencrypted encryption algorithm or encrypted encryption algorithm to the sensor modules 10A to 10C and executes algorithm second downloading means for downloading unencrypted new encryption algorithm or encrypted new encryption algorithm to the sensor modules 10A to 10C.

The firmware is an application for controlling an arithmetic/storage function of the microprocessor 27 of each of the sensor modules 10A to 10C and controlling external hardware connected to the processor 27. The firmware includes data reading control to allow the processor 27 of each of the sensor modules 10A to 10C to read the various data of the card while supporting various formats of the magnetic card. Further, data encryption control to allow the processor 27 of each of the sensor modules 10A to 10C to encrypt the card data (digital signal) based on the predetermined encryption algorithm is included. The firmware may perform optimal control of the arithmetic/storage function of the processor 27 according to an operation environment of each of the sensor modules 10A to 10C and perform optimal control of the external hardware connected to the processor 27 by using the same.

The magnetic card reader 52 is an insertion electric-powered type in which a controller (not illustrated) is embedded. Although not illustrated, the card reader 52 has a card insertion opening formed on a front end thereof, a card ejection opening formed on a rear end thereof, and a card guiding rail, which leads from the card insertion opening to the card ejection opening. The sensor modules 10A to 10C are attached to the center of the card reader 52. Optical sensors for detecting a position of the magnetic card, which moves on the guiding rail, are attached in the vicinity of the insertion opening, the ejection opening, and the sensor modules 10A to 10C.

When the magnetic card is inserted from the insertion opening, the card automatically moves on the guiding rail to be ejected from the ejection opening. Movement of the card on the guiding rail is realized by a belt attached in the card reader 52. The belt is driven by a motor installed in the card reader 52. The sensor modules 10A, to 10C, each sensor, and the motor are connected to the controller of the card reader 52.

The controller of the card reader 52 is the computer having the central processing unit (CPU or MPU) and the memory (high-capacity hard disk). The URL of the external server 51 is stored in the memory. The central processing unit of the controller is formed of the arithmetic unit and the controlling unit. The controller is connected to a DNS server (not illustrated) and the host computer 53. The controller may access the external server 51 via the Internet. The controller drives and stops the motor by turning on/off a switch and outputs a card data read start instruction and a card data read stop instruction to the sensor modules 10A to 10C.

The sensor modules 10A to 10C are connected to the host computer 13 through the interface. In the sensor modules 10A to 10C installed in the card reader 52, a tip end of the core, which composes the magnetic head 19, is opposed to the guiding rail. Although not illustrated, in the magnetic card, a color printed layer, a base layer, a magnetic layer, a shielding layer, and a printed layer are arranged in this order from a lower surface thereof. The magnetic layer is formed of a ferromagnetic substance and the base layer is formed of polyethylene terephthalate.

The central processing unit of the microprocessor 27 starts the application stored in the memory based on the control by the operating system and executes following respective means according to the started application. The central processing unit of the processor 27 executes the mutual authentication means for mutually authenticating with the external server 51 or the host computer 53. When the unencrypted firmware is downloaded from the external server 11 to the sensor modules 10A to 10C, the central processing unit of the processor 27 executes firmware storing means for storing the firmware in the memory.

When the encrypted firmware is downloaded from the server 51 to the sensor modules 10A to 10C, the central processing unit of the microprocessor 27 executes firmware decryption means for decrypting the encrypted firmware using the key stored in the memory and executes the firmware storing means for storing the decrypted firmware in the memory. When the upgraded new firmware is downloaded from the server 51 to the sensor modules 10A to 10C, the central processing unit of the processor 27 executes firmware updating means for rewriting the firmware before the upgrade to the upgraded firmware.

When the firmware is stored in the memory, the central processing unit of the microprocessor 27 starts the firmware stored in the memory and executes following respective means according to the started firmware. When unencrypted various encryption algorithms are downloaded from the external server 51 to the sensor modules 10A to 10C, the central processing unit of the processor 27 executes algorithm storing means for storing the encryption algorithms in the memory. Alternatively, when encrypted various encryption algorithms are downloaded from the external server 51 to the sensor modules 10A to 10C, this executes algorithm decryption means for decrypting the encrypted encryption algorithm using the key stored in the memory and executes the algorithm storing means for storing the decrypted encryption algorithm in the memory.

When the unencrypted new encryption algorithm is downloaded from the external server 51 to the sensor modules 10A to 10C, the central processing unit of the microprocessor 27 executes algorithm updating means for rewriting the already stored encryption algorithm to the new encryption algorithm. Alternatively, when the encrypted new encryption algorithm is downloaded from the external server 51 to the sensor modules 10A to 10C, this executes the algorithm decryption means for decrypting the encrypted new encryption algorithm using the key stored in the memory and executes the algorithm updating means for rewriting the already stored encryption algorithm to the decrypted new encryption algorithm. The central processing unit of the processor 27 executes format-supporting reading means for reading the various data from the card while supporting the various formats of the magnetic card and executes data encryption means for encrypting the card data (digital signal) based on the predetermined encryption algorithm. The central processing unit of the processor 27 executes encrypted data outputting means for outputting the encrypted card data to the host computer 53.

The host computer 53 has the central processing unit (CPU or MPU) and the memory (high-capacity hard disk). The central processing unit of the computer 53 is formed of the arithmetic unit and the controlling unit. An inputting device 56 such as the keyboard and the mouse, an outputting device 57 such as the display and the printer are connected to the computer 53 through the interface. The central processing unit of the computer 53 starts the application stored in the memory based on the control by the operating system and executes following respective means according to the started application.

The central processing unit of the host computer 53 executes the mutual authentication means for mutually authenticating with the microprocessor 27. When the encrypted card data is output from the sensor modules 10A to 10C, the central processing unit of the computer 53 executes data decryption means for decrypting the data and executes data storing means for storing decrypted data in the memory. The central processing unit of the computer 53 executes data outputting means for outputting the decrypted data through the outputting device 57.

Figure 14:
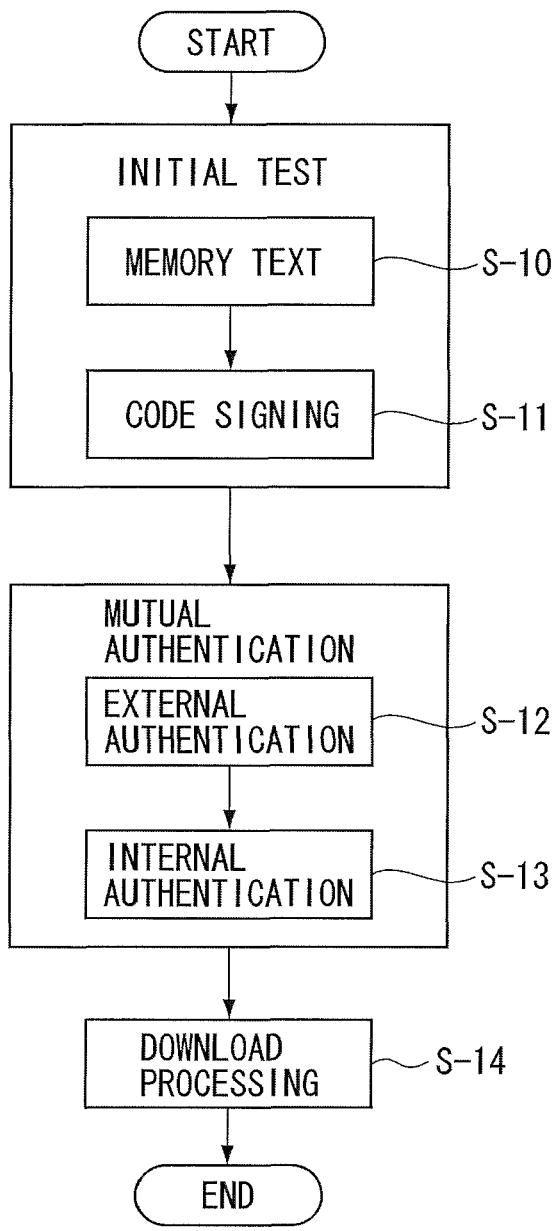
FIG. 14 is a block diagram illustrating an example of a process performed between an external server and a magnetic head.

FIG. 14 is a block diagram illustrating an example of a process performed between the external server 51 and the sensor modules 10A to 10C. An example of mutual authentication performed between the external server 51 and the sensor modules 10A to 10C is described as follows. When the system 50 is started, the external server 51, the magnetic card reader 52, and the host computer 53 operate. The server 51 uses the URL of the card reader 52 to access the card reader 52 via the Internet (accessing means). Alternatively, the card reader 52 uses the URL of the server 51 to access the server 51 via the Internet.

When the external server 51 and the controller of the magnetic card reader 52 are connected to each other via the Internet, the central processing unit of the server 51 and the central processing unit of the microprocessor 27 are connected to each other through the controller of the card reader 52. The central processing unit of the server 51 and the central processing unit of the processor 27 perform a memory test (S-10) and code signing (S-11) (initial test). In the code signing (S-11), it is judged whether an object code of the firmware is not rewritten. When the initial test is finished and a result thereof is correct, the central processing unit of the server 51 and the central processing unit of the processor 27 perform the mutual authentication to judge validity thereof (mutual authentication means). In the mutual authentication, the server 51 performs external authentication (S-12) for authenticating the validity of the sensor modules 10A to 10C and thereafter the sensor modules 10A to 10C perform internal authentication (S-13) for authenticating the validity of the server 51.

When the central processing unit of the external server 51 and the central processing unit of the microprocessor 27 judge that authentication results of each other by the mutual authentication are valid, download of the firmware and the encryption algorithm from the server 51 to the sensor modules 10A to 10C becomes possible and a downloading process is performed between the server 51 and the processor 27 (S-14). On the other hand, when at least one of the server 51 and the processor 27 judges that the authentication result is invalid, an authentication invalid message is displayed on a display of the server 51 and the download of the firmware and the encryption algorithm to the sensor modules 10A to 10C cannot be performed.

The mutual authentication between the server 51 and the processor 27 is performed each time the system 50 is started, performed on hourly or daily, weekly, or monthly basis when the system 50 is continuously operated, performed each time the firmware is downloaded to the sensor modules 10A to 10C, or performed each time the encryption algorithm is downloaded to the sensor modules 10A to 10C. Meanwhile, it is also possible that the server 51 and the processor 27 are connected to each other via the Internet and the server 15 downloads the firmware and the encryption algorithm to the sensor modules 10A to 10C without the mutual authentication between the server 51 and the processor 27.

Figure 15:
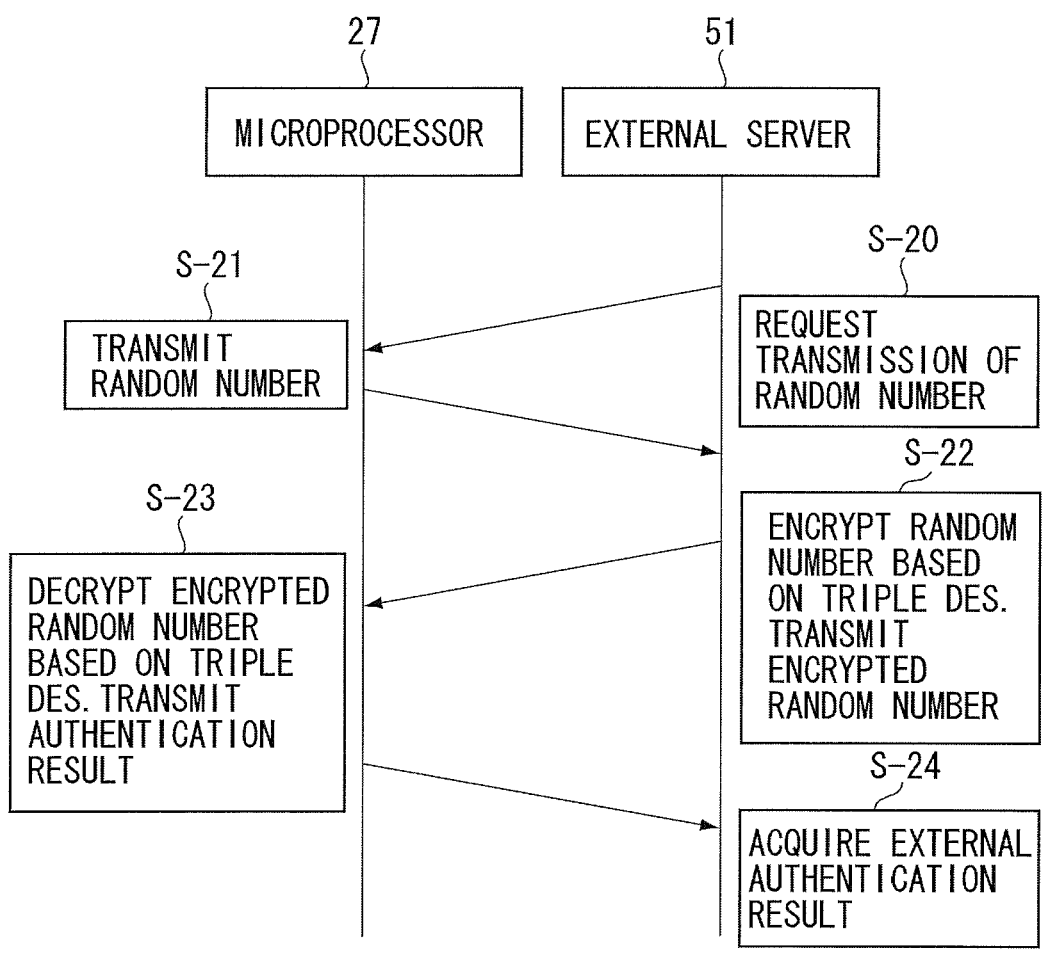
FIG. 15 is a ladder diagram illustrating an example of external authentication.
Figure 16:
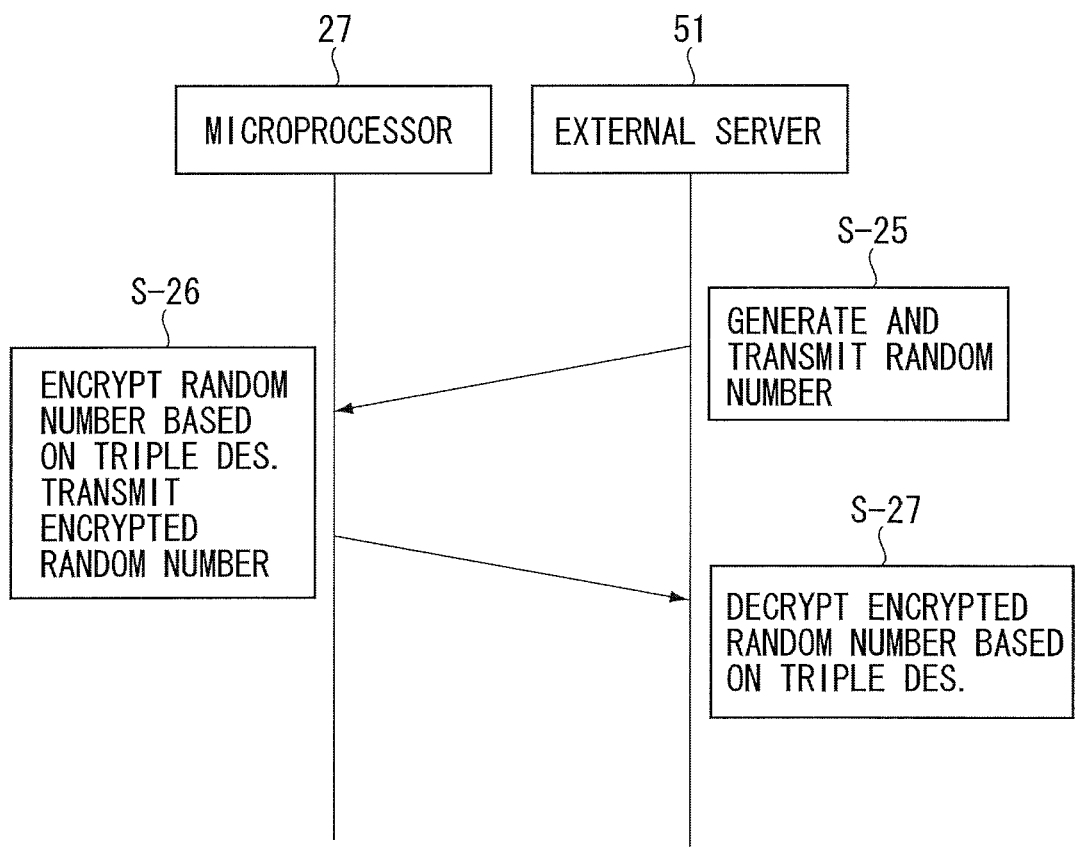
FIG. 16 is a ladder diagram illustrating an example of internal authentication.

FIG. 15 is a ladder diagram illustrating an example of the external authentication and FIG. 16 is a ladder diagram illustrating an example of the internal authentication. An authentication procedure in the external authentication is as follows. The central processing unit of the external server 51 requests the central processing unit of the microprocessor 27 to generate and transmit a random number (authenticator) (S-20). The central processing unit of the processor 27 generates a 64-bit random number according to an instruction of the server 51 and transmits the generated random number to the server 51 (S-21). The central processing unit of the server 51, which acquires the 64-bit random number, encrypts the random number with a triple data encryption standard (triple DES) using a key for authentication stored in the memory and transmits the encrypted random number to the processor 27 (S-22).

The central processing unit of the processor 27 decrypts the random number encrypted with the triple DES using the key for authentication stored in the memory. The central processing unit of the processor 27 compares the random number generated by the same and the decrypted random number, judges that the authentication result is valid when they are identical to each other, and transmits authentication result valid information to the server 51 (S-23). On the other hand, when the generated random number and the decrypted random number are different from each other, this judges that the authentication result is invalid and transmits authentication result invalid information to the server 51 (S-23). The server 51 acquires an external authentication result from the processor 27 (S-24).

In the triple DES, a single data encryption standard (single DES) is repeated three times to increase a key length or decrease bias of the algorithm, and encryption strength is enhanced. The triple DES includes 3-key triple DES in which all three keys are different from one another and 2-key triple DES in which the same key is used for first and third encryptions. Meanwhile, the triple DES may be either the 3-key triple DES or the 2-key triple DES. Also, the DES may be the single DES instead of the triple DES.

An authentication procedure in the internal authentication is as follows. The central processing unit of the external server 51 generates the 64-bit random number (authenticator) and transmits the same to the microprocessor 27 (S-25). The central processing unit of the processor 27, which acquires the 64-bit random number, encrypts the random number with the triple DES using the key for authentication stored in the memory and thereafter transmits the encrypted random number to the server 51 (S-26). The central processing unit of the server 51 decrypts the random number encrypted with the triple DES using the key for authentication stored in the memory (S-27). The central processing unit of the server 51 compares the random number generated by the same and the decrypted random number and when they are identical to each other, this judges that the authentication result is valid. On the other hand, when the generated random number and the decrypted random number are different from each other, this judges that the authentication result is invalid and disapproves of the download of the firmware and the encryption algorithm to the sensor modules 10A to 10C.

Figure 17:
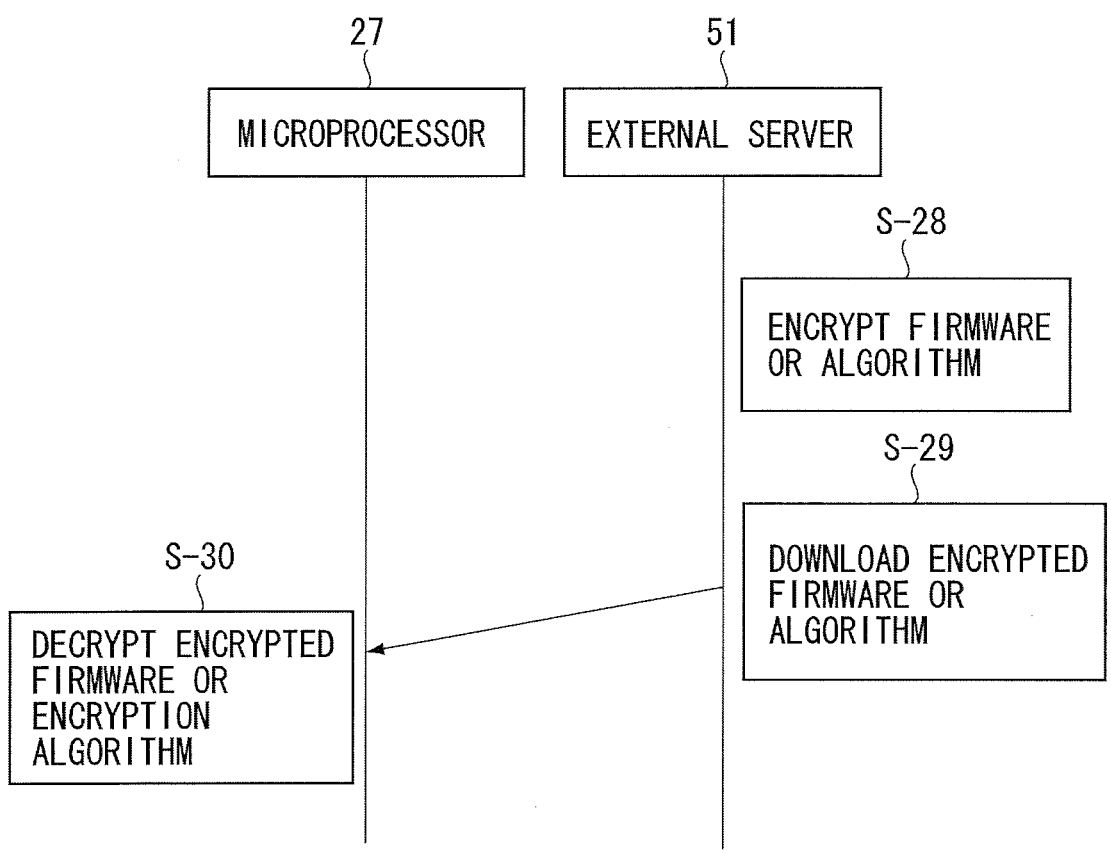
FIG. 17 is a ladder diagram illustrating an example of a downloading process between the external server and a microprocessor.

FIG. 17 is a ladder diagram illustrating an example of the downloading process between the external server 51 and the microprocessor 27. The firmware, the encryption algorithm, and a key for encryption for encrypting them are stored in the memory of the external server 51 and the upgraded new firmware or the new encryption algorithm are stored as needed. A key for decryption of the firmware and the encryption algorithm is stored in the memory of the microprocessor 27.

The central processing unit of the external server 51 takes the firmware, the encryption algorithm, and the key for encryption out of the memory and encrypts the firmware and the encryption algorithm with the triple DES using the key (firmware encryption means and algorithm encryption means) (S-28). The central processing unit of the server 51 downloads the encrypted firmware and encryption algorithm to the sensor modules 10A to 10C via the Internet (firmware first downloading means and algorithm first downloading means) (S-29). Meanwhile, when the firmware and the encryption algorithm are not encrypted, the central processing unit of the server 51 directly downloads them to the sensor modules 10A to 10C without encrypting them (firmware first downloading means and algorithm first downloading means) (S-29).

The central processing unit of the external server 51 takes the new firmware, the new encryption algorithm, and the key for encryption out of the memory when the download of the upgraded new firmware or new encryption algorithm to the sensor modules 10A to 10C is necessary, and encrypts the firmware and the encryption algorithm with the triple DES using the key (firmware encryption means and algorithm encryption means) (S-28). The central processing unit of the server 51 downloads the encrypted new firmware and new encryption algorithm to the sensor modules 10A to 10C via the Internet (firmware second downloading means and algorithm second downloading means) (S-29).

Meanwhile, when the new firmware and the new encryption algorithm are not encrypted, the central processing unit of the server 51 directly downloads them to the sensor modules 10A to 10C without encrypting them (firmware second downloading means and algorithm second downloading means) (S-29). The firmware and the encryption algorithm downloaded from the server 51 are temporarily stored in the memory of the controller of the magnetic card reader 52, and thereafter output from the controller to the sensor modules 10A to 10C.

When the central processing unit of the microprocessor 27 receives the encrypted firmware and encryption algorithm from the external server 51, this takes the key for decryption out of the memory and decrypts the firmware and the encryption algorithm encrypted with the triple DES using the key (firmware decryption means and algorithm decryption means) (S-30). The central processing unit of the processor 27 stores the decrypted firmware and encryption algorithm in the memory (firmware storing means and algorithm storing means). When the central processing unit of the processor 27 receives the unencrypted firmware and encryption algorithm from the external server 51, this stores the firmware and the encryption algorithm in the memory (firmware storing means and algorithm storing means).

When the central processing unit of the microprocessor 27 receives the encrypted new firmware and new encryption algorithm from the external server 51, this decrypts the new firmware and the new encryption algorithm encrypted with the triple DES using the key for decryption (firmware decryption means and algorithm decryption means) (S-30). The central processing unit of the processor 27 rewrites the firmware before the upgrade to upgraded composite firmware (firmware updating means) and stores the upgraded firmware in the memory. Further, this rewrites the already stored encryption algorithm to the decrypted new encryption algorithm (algorithm updating means) and stores the new encryption algorithm in the memory.

When the central processing unit of the processor 27 receives the unencrypted new firmware and new encryption algorithm from the server 51, this rewrites the firmware before the upgrade to the upgraded firmware (firmware updating means), stores the upgraded firmware in the memory, rewrites the already stored encryption algorithm to the new encryption algorithm (algorithm updating means), and stores the new encryption algorithm in the memory.

The firmware is rewritten when this is upgraded and when a specification of the magnetic card is changed and the format of the card is changed. The encryption algorithm is rewritten when it is necessary to rewrite the algorithm because this is analyzed by a third party, each time when the system 50 is started, on hourly or daily, weekly, or monthly basis, or when it is synchronized again after synchronization is lost.

FIGS. 18 to 23 are views for illustrating an example of generation of the key used for encryption and decryption. Each time the encrypted firmware or encryption algorithm are downloaded to the sensor modules 10A to 10C, the central processing unit of the external server 51 and the central processing unit of the microprocessor 27 sequentially generate identical new second to n-th keys necessary for encrypting and decrypting the firmware or the encryption algorithm in synchronization with each other using identical and finite regression counter values stored in the memories of them in advance (key generating means). An example of a key generating procedure performed by the central processing unit of the server 15 and the central processing unit of the processor 27 is described as follows. Meanwhile, the regression counter values range from 1 to 20. The regression counter value is not especially limited and the counter value may be set to 21 or larger.

Figure 18:
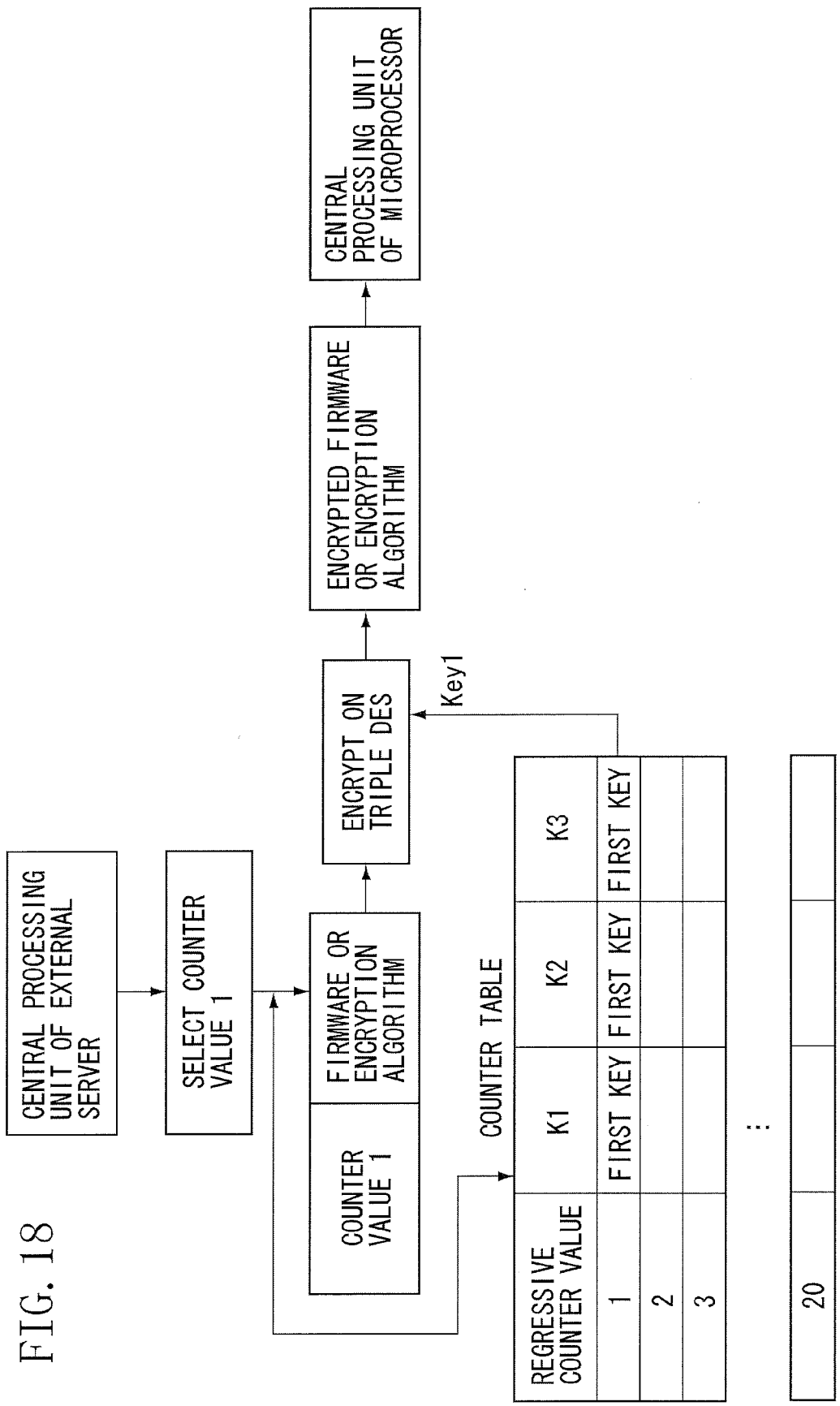
FIG. 18 is a view illustrating an example of generation of a key used for encryption and decryption.

When the external server 51 downloads first firmware (new firmware) or encryption algorithm (new algorithm) to the sensor modules 10A to 10C, the central processing unit of the server 15 selects the regression counter value 1 from a counter table stored in the memory and attaches the counter value 1 to the firmware and the encryption algorithm as illustrated in FIG. 18. Storage areas of the counter values (1 to 20) and storage areas of three keys corresponding to the same (K1, K2 and K3) are created in the counter table. However, second to 20th keys corresponding to the regression counter values 2 to 20 are not generated in the counter table in FIG. 18. Meanwhile, a first key (Key1) corresponding to the counter value 1 is set upon introduction of the system 50 as an initial value.

The central processing unit of the external server 51 takes the first key corresponding to the counter value 1 out of the counter table, encrypts the firmware or the encryption algorithm and the counter value 1 with the triple DES (3-key triple DES) using the first key (firmware encryption means and algorithm encryption means) and downloads the encrypted firmware and encryption algorithm to the sensor modules 10A to 10C (firmware first downloading means and algorithm first downloading means). After downloading the encrypted firmware and encryption algorithm to the sensor modules 10A to 10C, the central processing unit of the server 51 changes the regression counter value from 1 to 2 and stores the counter value 2 in the memory.

Figure 19:
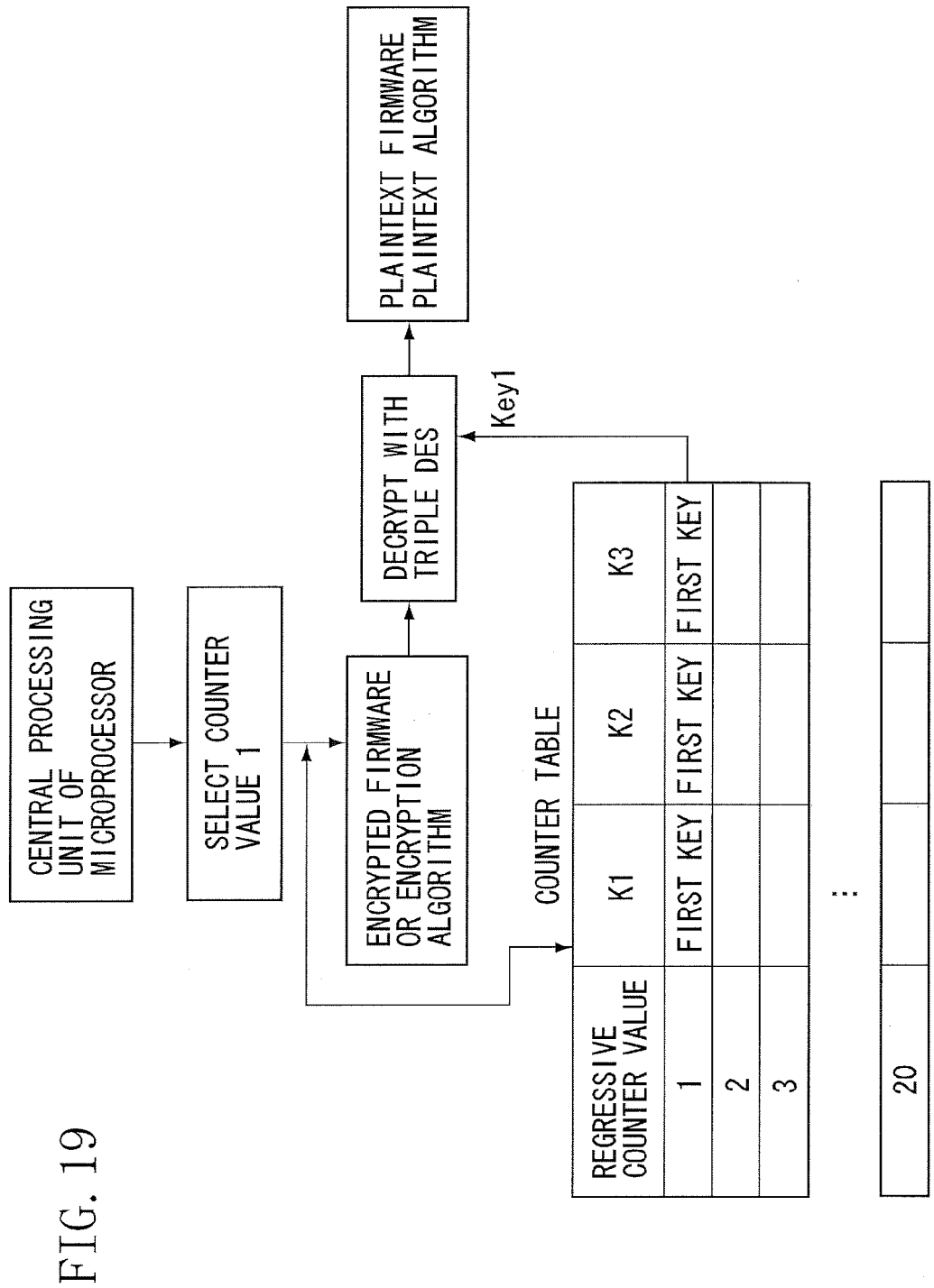
FIG. 19 is a view illustrating an example of the generation of the key used for encryption and decryption.

The central processing unit of the microprocessor 27, which receives the encrypted firmware (first firmware) or the encrypted encryption algorithm (first encryption algorithm), selects the regression counter value 1 from the counter table stored in the memory as illustrated in FIG. 19. The storage areas of the counter values (1 to 20) and the storage areas of the three keys corresponding to the same (K1, K2 and K3) are created in the counter table. However, the second to 20th keys corresponding to the regression counter values 2 to 20 are not generated in the counter table in FIG. 19. Meanwhile, the first key (Key1) corresponding to the counter value 1 is identical to the first key stored in the memory of the external server 51 and is set upon the introduction of the system 50 as the initial value.

The central processing unit of the microprocessor 27 takes the first key corresponding to the counter value 1 out of the counter table, decrypts the firmware and the encryption algorithm encrypted with the triple DES (3-key triple DES) using the first key and acquires plaintext firmware and a plaintext algorithm (firmware decryption means and algorithm decryption means). The central processing unit of the processor 27 decrypts the firmware and the encryption algorithm, then stores them in the memory (firmware storing means and algorithm storing means), and changes the regression counter value from 1 to 2 to store the counter value 2 in the memory.

Figure 20:
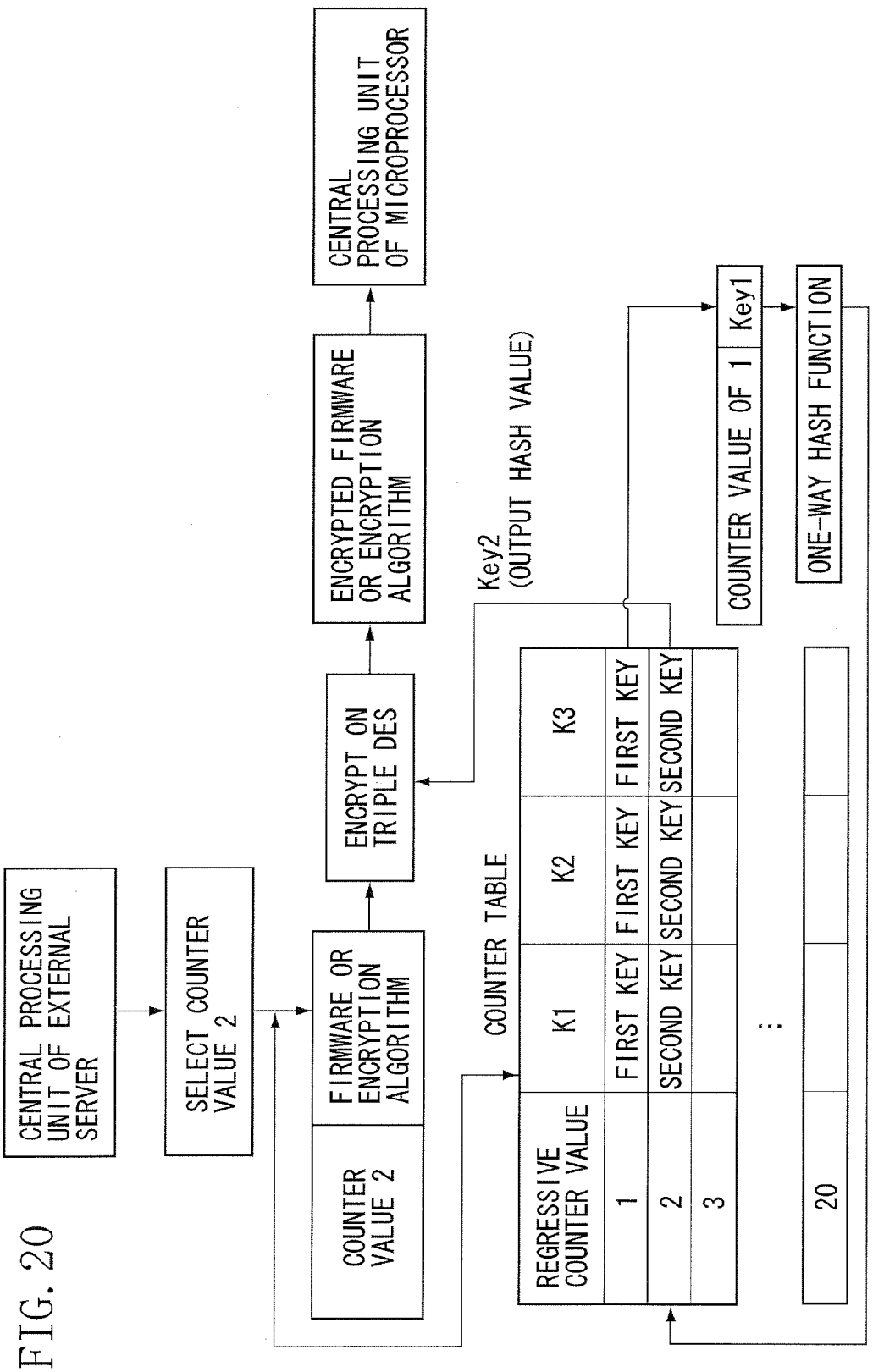
FIG. 20 is a view illustrating an example of the generation of the key used for encryption and decryption.

The external server 51 may stop usage of the firmware and the encryption algorithm currently used by the microprocessor 27, select the new firmware and the new algorithm from the firmware and the encryption algorithm stored in the memory, and allow the same to use the firmware and the algorithm. When the server 51 downloads second firmware (upgraded firmware) or second encryption algorithm (new encryption algorithm) to the sensor modules 10A to 10C, the central processing unit of the external server 51 selects the regression counter value 2 from the counter table stored in the memory and attaches the counter value 2 to the second firmware and encryption algorithm as illustrated in FIG. 20.

The central processing unit of the external server 51 generates a hash output value obtained by hashing the first key (initial value) corresponding to the counter value 1 and the counter value 1 by a one-way hash function and uses the hash output value as a second key (Key2) corresponding to the counter value 2 (key generating means). The hash output value, which becomes the second key (Key2), is written in the key storage areas (K1, K2, and K3) corresponding to the counter value 2 in the counter table. Meanwhile, the third to 20th keys corresponding to the regression counter values 3 to 20 are not generated in the counter table in FIG. 20.

The central processing unit of the external server 51 takes the second key corresponding to the counter value 2 out of the counter table, encrypts the firmware and the encryption algorithm (including the counter value 2) with the triple DES (3-key triple DES) using the second key (firmware encryption means and algorithm encryption means), and downloads the encrypted firmware and encryption algorithm to the sensor modules 10A to 10C (firmware second downloading means and algorithm second downloading means). The central processing unit of the server 51 downloads the encrypted firmware or encryption algorithm to the sensor modules 10A to 10C, then changes the regression counter value from 2 to 3, and stores the counter value 3 in the memory.

Figure 21:
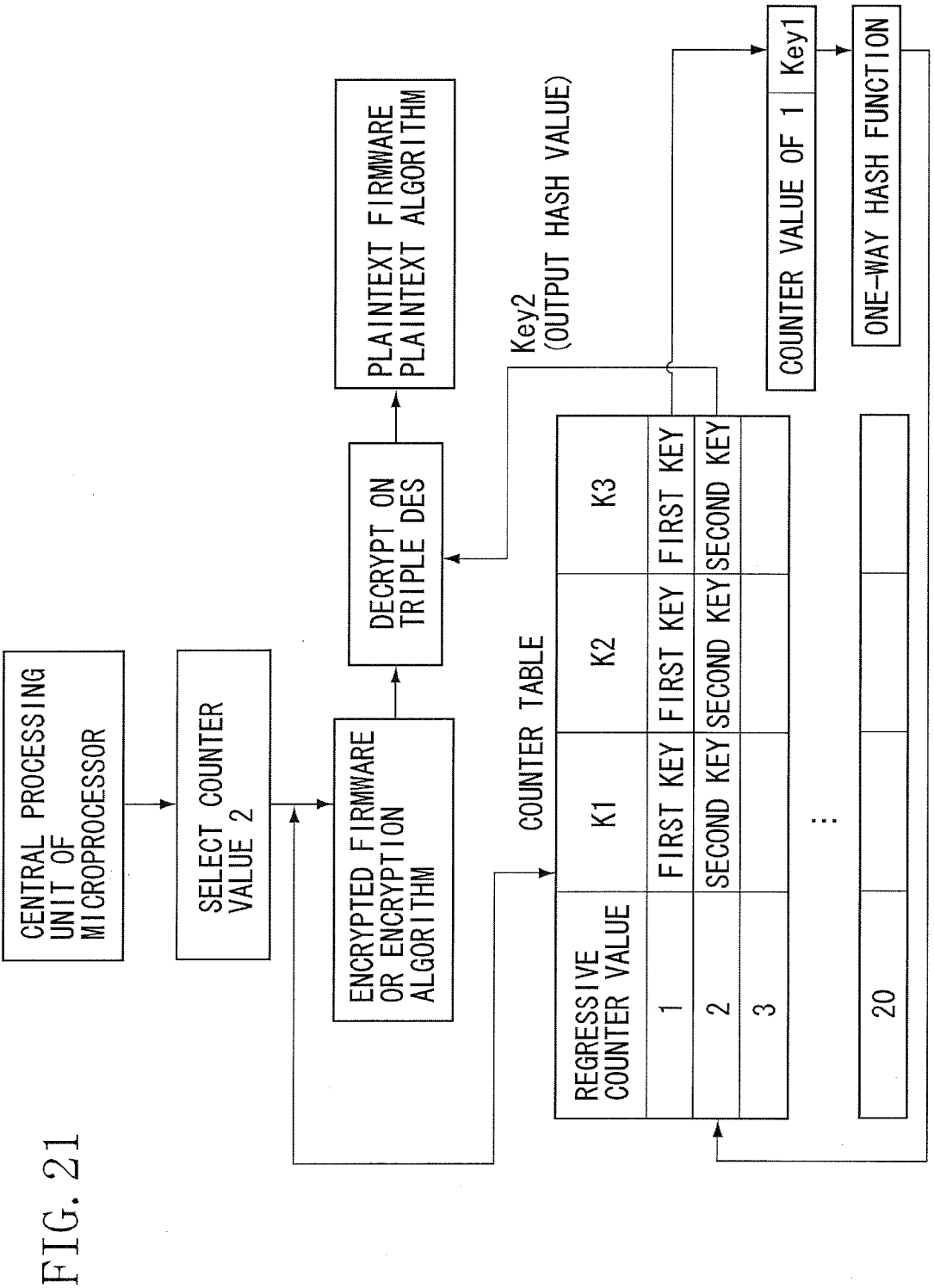
FIG. 21 is a view illustrating an example of the generation of the key used for encryption and decryption.

The central processing unit of the microprocessor 27, which receives the encrypted firmware (second firmware) or the encrypted encryption algorithm (second encryption algorithm), selects the regression counter value 2 from the counter table stored in the memory as illustrated in FIG. 21. The central processing unit of the processor 27 generates the hash output value obtained by hashing the first key (initial value) corresponding to the counter value 1 and the counter value 1 by the one-way hash function and uses the hash output value as the second key (Key2) corresponding to the counter value 2 (key generating means). The hash function used by the central processing unit of the processor 27 is identical to that used by the central processing unit of the server 51 and the generated second key (Key2) is identical to that generated by the central processing unit of the server 51. The hash output value, which becomes the second key (Key2), is written in the key storage areas (K1, K2, and K3) corresponding to the counter value 2 in the counter table. Meanwhile, the third to 20th keys corresponding to the regression counter values 3 to 20 are not generated in the counter table in FIG. 21.

The central processing unit of the microprocessor 27 takes the second key corresponding to the counter value 2 out of the counter table and decrypts the firmware and the encryption algorithm encrypted with the triple DES (3-key triple DES) using the second key to acquire the plaintext firmware and the plaintext algorithm (firmware decryption means and algorithm decryption means). The central processing unit of the processor 27 decrypts the firmware and the encryption algorithm, then stores them in the memory (firmware storing means and algorithm storing means), and changes the regression counter value from 2 to 3 to store the counter value 3 in the memory.

Figure 22:
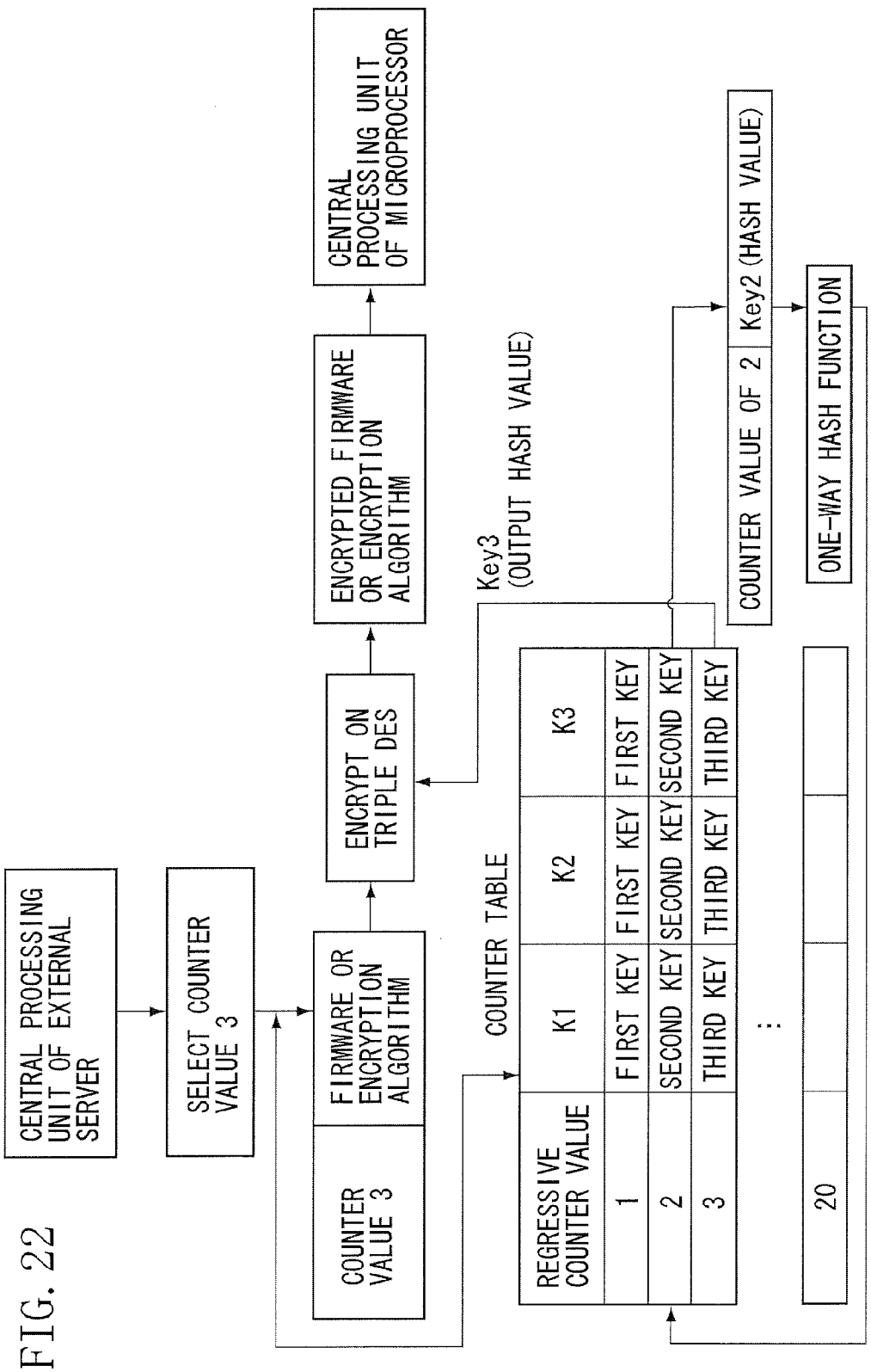
FIG. 22 is a view illustrating an example of the generation of the key used for encryption and decryption.

When the external server 51 downloads third firmware (upgraded firmware) or a third encryption algorithm (new encryption algorithm) to the sensor modules 10A to 10C, the central processing unit of the server 51 selects the regression counter value 3 from the counter table stored in the memory and attaches the counter value 3 to the third firmware and the encryption algorithm as illustrated in FIG. 22.

The central processing unit of the external server 51 generates the hash output value obtained by hashing the second key (Key2, hash value) corresponding to the counter value 2 and the counter value 2 by the one-way hash function and uses the hash output value as a third key (Key3) corresponding to the counter value 3 (key generating means). The hash output value, which becomes the third key (Key3), is written in the key storage areas (K1, K2 and K3) corresponding to the counter value 3 of the counter table. Meanwhile, the fourth to 20th keys corresponding to the regression counter values 4 to 20 are not generated in the counter table in FIG. 22.

The central processing unit of the external server 51 takes the third key corresponding to the counter value 3 out of the counter table, encrypts the firmware and the encryption algorithm (including the counter value 3) with the triple DES (3-key triple DES) using the third key (firmware encryption means and algorithm encryption means), and downloads the encrypted firmware and encryption algorithm to the sensor modules 10A to 10C (firmware second downloading means and algorithm second downloading means). The central processing unit of the server 51 downloads the encrypted firmware or encryption algorithm to the sensor modules 10A to 10C, then changes the regression counter value from 3 to 4, and stores the counter value 4 in the memory.

Figure 23:
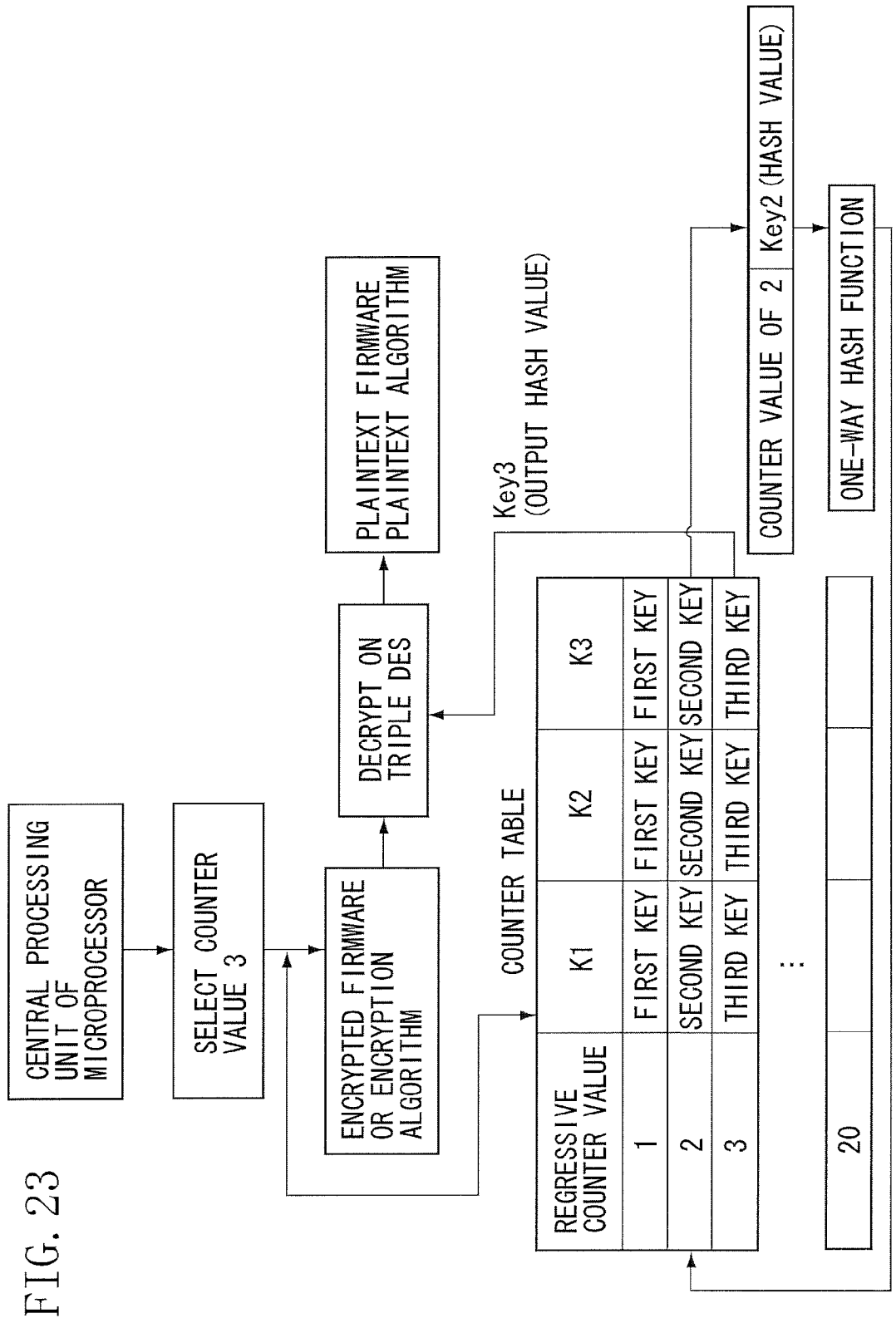
FIG. 23 is a view illustrating an example of the generation of the key used for encryption and decryption.

The central processing unit of the microprocessor 27, which receives the encrypted firmware (third firmware) or the encrypted encryption algorithm (third encryption algorithm), selects the regression counter value 3 from the counter table stored in the memory as illustrated in FIG. 23. The central processing unit of the processor 27 generates the hash output value obtained by hashing the second key (Key2) corresponding to the counter value 2 and the counter value 2 by the one-way hash function and uses the hash output value as the third key (Key3) corresponding to the counter value 3 (key generating means). The third key (Key3) generated by the central processing unit of the processor 27 is identical to that generated by the central processing unit of the external server 51. The hash output value, which becomes the third key (Key3), is written in the key storage areas (K1, K2, and K3) corresponding to the counter value 3 in the counter table. Meanwhile, the fourth to 20th keys corresponding to the regression counter values 4 to 20 are not generated in the counter table in FIG. 23.

The central processing unit of the microprocessor 27 takes the third key corresponding to the counter value 3 out of the counter table, decrypts the firmware and the encryption algorithm encrypted with the triple DES (3-key triple DES) using the third key, and acquires the plaintext firmware and the plaintext algorithm (firmware decryption means and algorithm decryption means). The central processing unit of the processor 27 decrypts the firmware and the encryption algorithm, then stores them in the memory (firmware storing means and algorithm storing means), changes the regression counter value from 3 to 4, and stores the counter value 4 in the memory.

In this manner, the central processing unit of the external server 51 and the central processing unit of the microprocessor 27 generate the second to n-th keys using the one-way hash function in synchronization with each other using the regression counter values 1 to 20 in turn. When the regression counter value becomes larger than 20, the central processing unit of the server 51 and the central processing unit of the processor 27 sequentially generate 21st to 40th keys using the counter value 1 again. When the central processing unit of the server 51 and the central processing unit of the processor 27 generate the 21st key, they rewrite the first key stored in the key storage area to the 21st key, and when they generate the 22nd key, they rewrite the second key stored in the key storage area to the 22nd key.

In the magnetic card reading system 50, the central processing unit of the external server 51 and the central processing unit of the microprocessor 27 may judge the validity of each other by executing the mutual authentication means, so that when a fake server is connected to the sensor modules 10A to 10C and when a fake sensor module is connected to the external server 51, it is possible to detect them. In the system 50, the third party cannot access the sensor modules 10A to 10C using the fake server, so that it is possible to prevent unauthorized use of the magnetic card by the third party by tampering of the firmware. Also, in the system 50, the third party cannot access the external server 51 using the fake sensor module and the encryption algorithm is never downloaded from the server 51 to the fake sensor module.

In the system 50, since the central processing unit of the external sever 51 and the central processing unit of the microprocessor 27 individually generate the second to n-th keys, it is not necessary to transmit the key from the server 51 to the processor 27 and unauthorized acquisition of the key in a transmission process of the key may be prevented. In the system 50, the central processing unit of the server 51 encrypts the firmware and the encryption algorithm always using a different key and the central processing unit of the processor 27 decrypts the firmware and the encryption algorithm always using a different key, so that the firmware and the encryption algorithm cannot be decrypted even when the third party acquires the key. Also, since the hash values are used as the second to n-th keys, even when the third party acquires the key in an unauthorized manner, it is not possible to decipher the key and the usage of the key by the third party may be surely prevented.

In the system 50, the central processing unit of the external server 51 and the central processing unit of the microprocessor 27 sequentially generate the second to n-th keys in synchronization with each other using the identical and finite regression counter values, so that the key generated by the server 15 and the key generated by the processor 27 may match each other and it is possible to prevent inability to decrypt the encrypted data due to mismatch of the generated keys. Also, since the hash output value obtained by hashing the regression counter value is included in the hash output values, which become the second to n-th keys, even when the third party enters the system 50 in an unauthorized manner, it is not possible to decipher the hashed regression counter value and it is not possible to determine which counter value is being used for the synchronization between the central processing unit of the server 51 and the central processing unit of the processor 27.

When the synchronization between the central processing unit of the external server 51 and the central processing unit of the microprocessor 27 is lost while the system 50 operates, the key generated by the central processing unit of the server 51 and the key generated by the central processing unit of the processor 27 are different from each other and the central processing unit of the processor 27 cannot decrypt the encrypted data downloaded from the central processing unit of the server 51. In this case, the central processing unit of the processor 27 judges that the decryption using the generated key is not possible and transmits inability to decrypt to the server 51 (inability to decrypt information transmitting means) and requests resynchronization with the server 51 (resynchronization requesting means).

The central processing unit of the microprocessor 27 requests the controller of the card reader 52 to access the external server 51 and encrypts the inability to decrypt information and resynchronization request with the triple DES using the key for data transmission and reception stored in the memory. When the server 51 and the card reader 52 are connected to each other via the Internet, the central processing unit of the processor 27 transmits the encrypted inability to decrypt information and resynchronization request to the server 51. The central processing unit of the processor 27 and the central processing unit of the server 51, which receives the resynchronization request, perform the external authentication and the internal authentication (refer to FIGS. 15 and 16) for judging the validity thereof (mutual authentication means). When the central processing unit of the server 51 and the central processing unit of the processor 27 judge that the authentication results of each other by the mutual authentication are valid, they return the regression counter value to 1 (initial value) to start the synchronization again. When the central processing unit of the server 51 and the central processing unit of the processor 27 return the counter value to 1, they encrypt and decrypt using the first key again.

In the system 50, even when the mismatch occurs between the keys generated by the external server 51 and the microprocessor 27, the server 51 and the processor 27 may return the regression counter value to 1 to synchronize with each other again, so that the key generated by the server 51 and the key generated by the processor 27 may match each other again, thereby preventing the inability to decrypt the firmware and the encryption algorithm due to the mismatch of the generated keys. Meanwhile, when the system 50 continuously operates and the mutual authentication is performed on hourly or daily, weekly, or monthly basis, when the central processing unit of the server 51 and the central processing unit of the processor 27 judge that the authentication results of each other by the mutual authentication are valid, they return the regression counter value to 1 to start the synchronization again. Following procedure is identical to that described with reference to FIGS. 18 to 23.

Any one of Secure Hash Algorithm 1 (SHA-1), Message Digest 2, 4, 5 (MD2, MD4, MD5), RIPEMD-80, RIPEMD-128, RIPEMD-160, and N-Hash is used as the one-way hash function. The hash functions are stored in the memory of the external server 51 and the memory of the host computer 53.

Any one of RSA, Advanced Encryption Standard (AES), International Data Encryption Algorithm (IDEA), Fast Encryption Algorithm (FEAL-N/NX), Multimedia Encryption2 (MULTI2), MISTY, Substitution Xor Algorithm (SXAL), Multi Block Algorithm (MEAL), RC2, RC5, ENCRiP, Secure And Fast Encryption Routine (SAFER), Blowfish, Skipjack, Khufu, Khafre, CAST, and GOST28147-89 may be used as the encryption algorithm in addition to DES. The algorithms are stored in the memory of the external server 51 and the memory of the host computer 53.

In the system 50, the server 51 may download the firmware and the encryption algorithm to the processor 27 without the generation of the key by the external server 51 and the microprocessor 27 as illustrated in FIGS. 18 to 23. An example of this is described as follows. The external server 51 accesses the card reader 52 via the Internet using the URL of the card reader 52 (accessing means). Alternatively, the card reader 52 accesses the server 51 via the Internet using the URL of the external server 51. When the server 51 and the card reader 52 are connected to each other via the Internet, the central processing unit of the server 51 and the central processing unit of the microprocessor 27 are connected to each other by means of the controller. The central processing unit of the server 51 and the central processing unit of the processor 27 perform the external authentication and the internal authentication (refer to FIGS. 15 and 16) for judging the validity thereof (mutual authentication means). When the central processing unit of the server 51 and the central processing unit of the processor 27 judge that the authentication results of each other by the mutual authentication are valid, the download of the firmware and the encryption algorithm from the server 51 to the sensor modules 10A to 10C becomes possible and the downloading process is performed between the server 51 and the processor 27.

The central processing unit of the external server 51 encrypts the new firmware and encryption algorithm with the triple DES using key for information transmission and reception stored in the memory (firmware encryption means and algorithm encryption means) and downloads the encrypted firmware and algorithm to the sensor modules 10A to 10C (firmware first downloading means and algorithm first downloading means). The firmware and the encryption algorithm downloaded from the server 51 are temporarily stored in the memory of the controller of the card reader 52, and thereafter output to the sensor modules 10A to 10C.

When the central processing unit of the microprocessor 27 receives the encrypted firmware and encryption algorithm from the server 51, this decrypts the firmware and the algorithm encrypted with the triple DES using the key for information transmission and reception stored in the memory to acquire the plaintext firmware and the plaintext algorithm (firmware decryption means and algorithm decryption means) and stores the decrypted firmware and algorithm in the memory (firmware storing means and algorithm storing means).

The external server 51 may stop the usage of the firmware and the encryption algorithm currently used by the microprocessor 27, select the new firmware and the new algorithm from the firmware and the encryption algorithm stored in the memory, and allow the same to use the firmware and the algorithm. When the server 51 allows the processor 27 to use the new firmware and the new encryption algorithm, this instructs the processor 27 to rewrite the existing firmware and encryption algorithm (updating instruction). Meanwhile, suppose that the external authentication and the internal authentication (refer to FIGS. 15 and 16) are already performed and the server 51 and the processor 27 judge that the authentication results of each other by the mutual authentication are valid.

The central processing unit of the external server 51 encrypts the updating instruction, the new firmware, and the new encryption algorithm with the triple DES using the key for information transmission and reception stored in the memory (firmware encryption means and algorithm encryption means) and downloads the encrypted updating instruction, firmware and algorithm to the sensor modules 10A to 10C (firmware second downloading means and algorithm second downloading means). The updating instruction, the firmware, and the encryption algorithm downloaded from the server 51 are temporarily stored in the memory of the controller of the card reader 52, and thereafter output to the sensor modules 10A to 10C.

When the central processing unit of the microprocessor 27 receives the encrypted updating instruction, firmware, and encryption algorithm from the external server 51, this decrypts the updating instruction, the firmware, and the algorithm encrypted with the triple DES using the key for information transmission and reception stored in the memory (firmware decryption means and algorithm decryption means). The central processing unit of the processor 27 rewrites the existing firmware stored in the memory to the decrypted new firmware (firmware updating means) and stores the new firmware in the memory. Further, the central processing unit of the processor 27 rewrites the existing algorithm stored in the memory to the decrypted new algorithm (algorithm updating means) and stores the new algorithm in the memory. The central processing unit of the processor 27 notifies the server 51 of completion of update (update completion notification). The central processing unit of the processor 27 encrypts the update completion notification with the triple DES using the key for information transmission and reception stored in the memory and transmits the encrypted upgrade completion notification to the server 51.

The external server 51 may stop using the hash function currently used and select a new hash function out of the hash functions stored in the memory to use the hash function. The hash function is changed each time the system 50 is started, performed on hourly or daily, weekly, or monthly basis, or performed when it is synchronized again after the synchronization is lost. When the server 51 uses the new hash function, this instructs the microprocessor 27 to rewrite the existing hash function (function changing instruction). The central processing unit of the server 51 accesses the card reader 52. When the server 51 and the card reader 52 are connected to each other via the Internet, the central processing unit of the server 51 and the central processing unit of the processor 27 perform the external authentication and the internal authentication (refer to FIGS. 15 and 16) for judging the validity thereof (mutual authentication means). When the central processing unit of the server 51 and the central processing unit of the processor 27 judge that the authentication results of each other by the mutual authentication are valid, the central processing unit of the server 51 encrypts the function changing instruction and the new hash function with the triple DES using the key for data transmission and reception stored in the memory and transmits the encrypted function changing instruction and hash function to the processor 27.

When the central processing unit of the microprocessor 27 receives the function changing instruction and the hash function, this decrypts the function changing instruction and the hash function encrypted with the triple DES using the key for data transmission and reception stored in the memory. The central processing unit of the processor 27 changes the existing hash function stored in the memory to the decrypted new hash function and thereafter notifies the external server 51 of completion of the change (change completion notifying means). The central processing unit of the processor 27 encrypts the change completion notification with the triple DES using the key for data transmission and reception stored in the memory and transmits the encrypted change completion notification to the server 51. The system 50 changes the hash function by encrypting the function changing instruction and the hash function, so that the hash function used is not acquired by the third party and it is possible to prevent the hash function from being deciphered by the third party.

In the magnetic card reading system 50, when the firmware or the encryption algorithm is downloaded from the external server 51 to the sensor modules 10A to 10C, the processor 27 stores the firmware and the encryption algorithm in the memory, so that the firmware and the encryption algorithm downloaded from the server 51 may be stored in the processor 27 as needed after the sensor modules 10A to 10C are shipped to a market and after the sensor modules 10A to 10C are installed on the magnetic card reader 52.

The system 50 may support various types of firmware even after the shipment or installation of the sensor modules 10A to 10C, and by using the firmware, the optimal control of the arithmetic/storage function of the processor 27 according to the operational environment of the sensor modules 10A to 10C and the optimal control of the external hardware may be performed. The system 50 may allow the sensor modules 10A to 10C to support the various formats of the magnetic card after the shipment and the installation of the sensor modules 10A to 10C and may allow the sensor modules 10A to 10C to surely read the data stored in the card while adapting to the various specifications of the magnetic card.

The system 50 may use the various encryption algorithms even after the shipment or the installation of the sensor modules 10A to 10C and encrypt the card data using the algorithms. In the system 50, the processor 27 rewrites the firmware before the upgrade to the upgraded firmware, so that even when the firmware is upgraded after the shipment or the installation of the sensor modules 10A to 10C, it is possible to immediately support the upgraded firmware.

Figure 24:
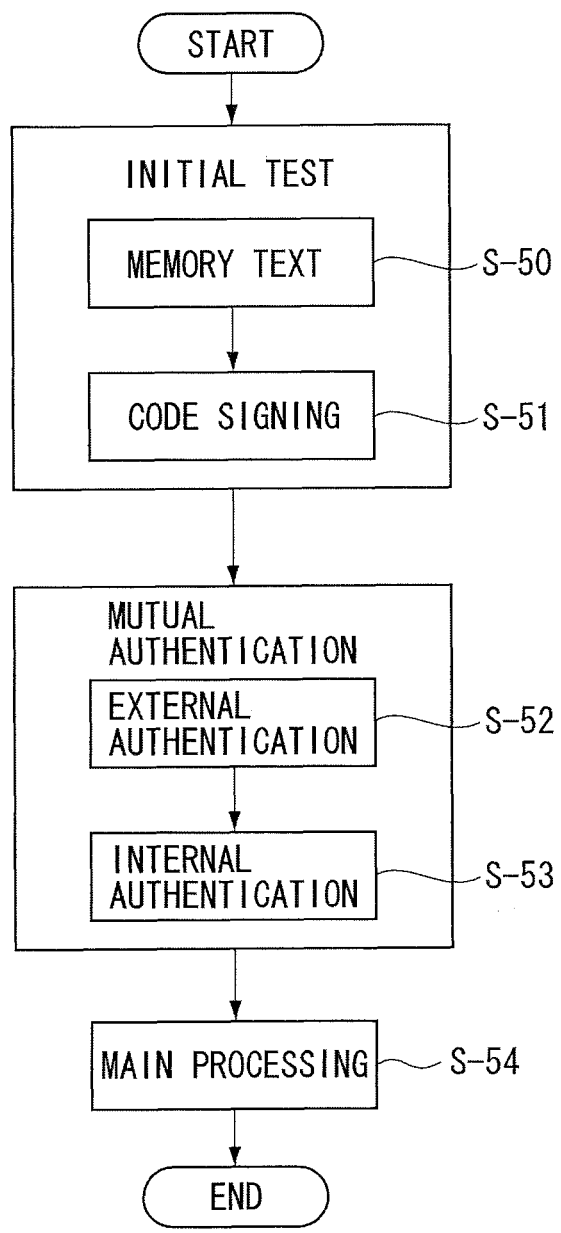
FIG. 24 is a block diagram illustrating an example of a process performed between the magnetic head and a host computer.

FIG. 24 is a block diagram illustrating an example of a process performed between the sensor modules 10A to 10C and the host computer 53. When the system 50 is started, the central processing unit of the host computer 53 and the central processing unit of the microprocessor 27 perform the memory test (S-50) and the code signing (S-51) (initial test). When the initial test is finished and the result thereof is correct, the central processing unit of the computer 53 and the central processing unit of the processor 27 perform the mutual authentication to judge the validity thereof (mutual authentication means). As the mutual authentication, the computer 53 performs the external authentication to authenticate the validity of the sensor modules 10A to 10C (S-52), and thereafter the magnetic head 19 performs the internal authentication to authenticate the validity of the computer 13 (S-53).

When the central processing unit of the computer 53 and the central processing unit of the microprocessor 27 judge that the authentication results of each other by the mutual authentication are valid, reading of the magnetic card by the magnetic card reader 52 becomes possible and a main process (S-54) is performed between the computer 53 and the processor 27. On the other hand, when at least one of the computer 53 and the processor 27 judges that the authentication result is invalid, the card reader 52 cannot read the magnetic card and an inability to read message is displayed on the display of the computer 53. The mutual authentication is performed each time the system 50 is started, or performed on hourly or daily, weekly, or monthly basis when the system 50 is continuously operated, or performed when the synchronization between the central processing unit of the computer 53 and the central processing unit of the processor 27 is lost as described later.

Figure 25:
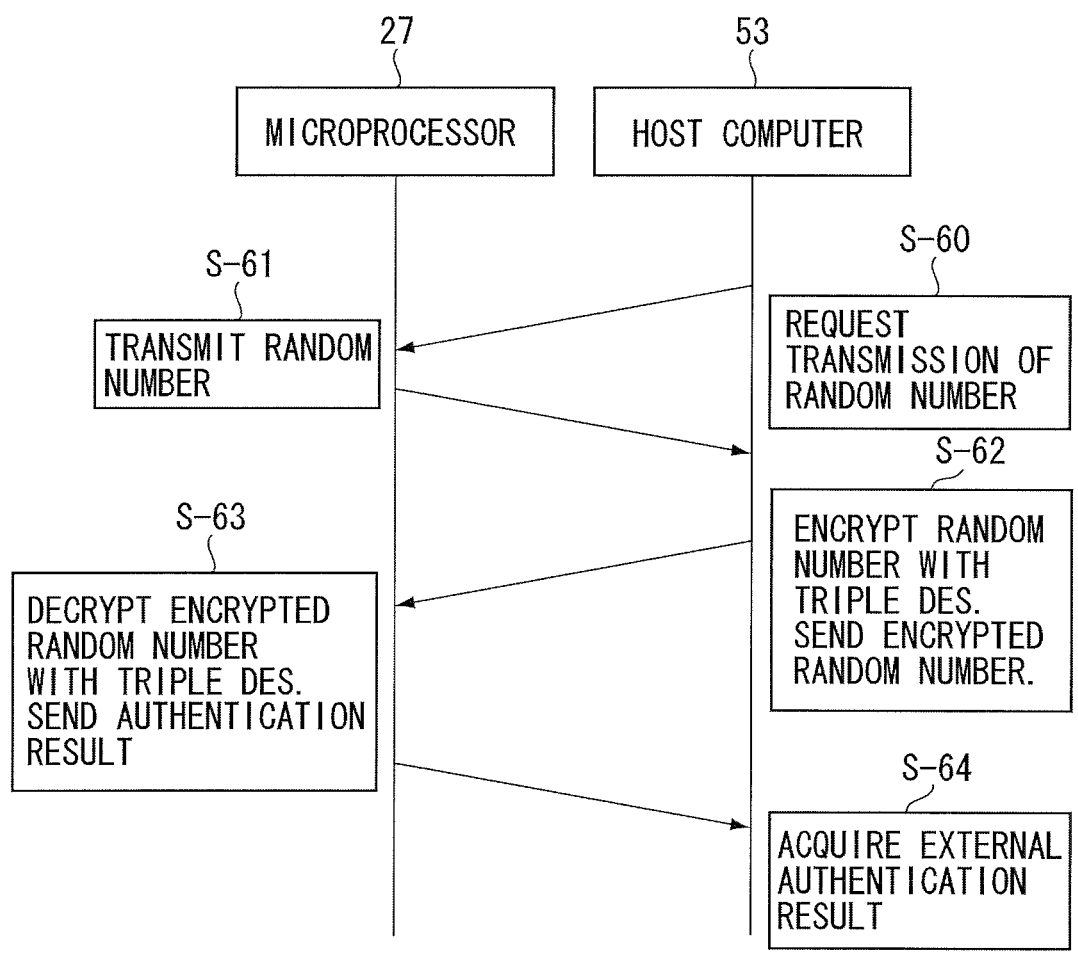
FIG. 25 is a ladder diagram illustrating an example of the external authentication.
Figure 26:
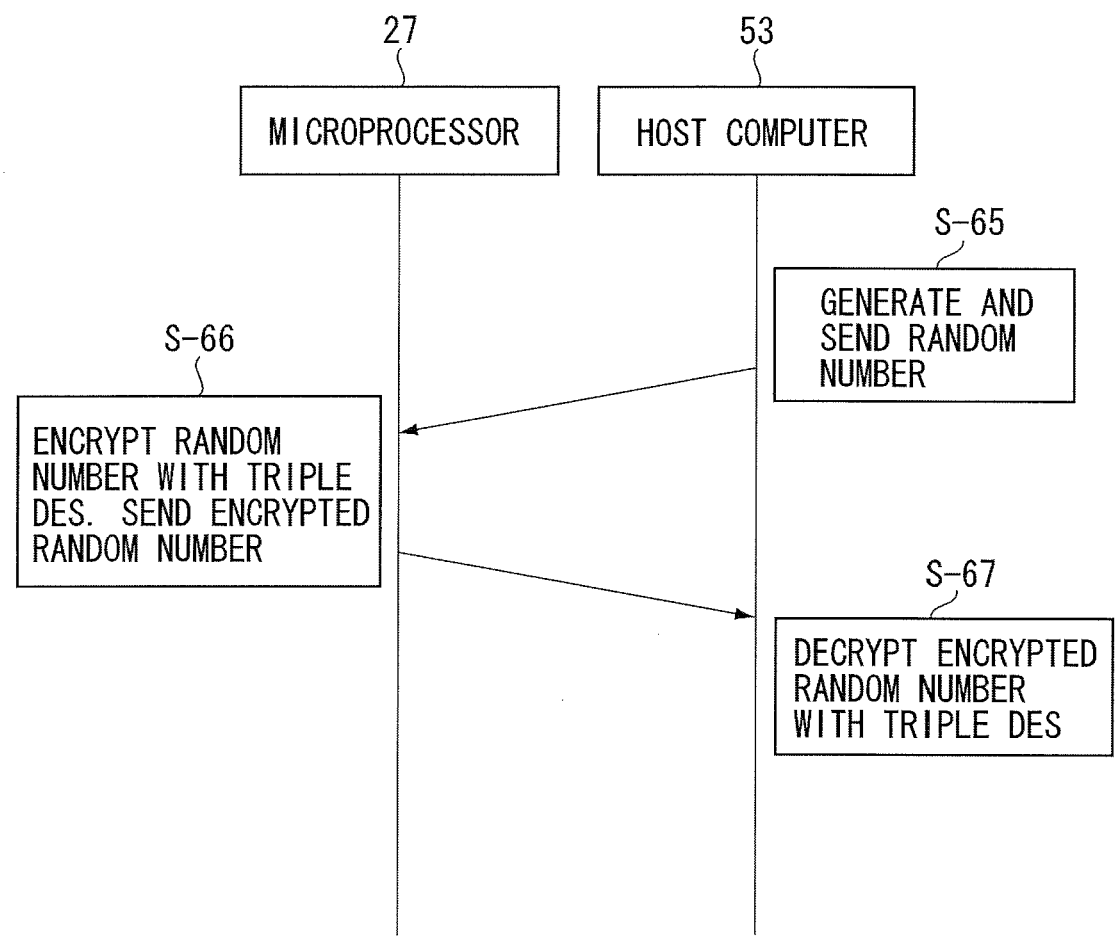
FIG. 26 is a ladder diagram illustrating an example of the internal authentication.

FIG. 25 is a ladder diagram illustrating an example of the external authentication and FIG. 26 is a ladder diagram illustrating an example of the internal authentication. The authentication procedure in the external authentication is as follows. The central processing unit of the host computer 53 requests the central processing unit of the microprocessor 27 to generate and transmit the random number (authenticator) (S-60). The central processing unit of the processor 27 generates the 64-bit random number according to the instruction of the computer 53 and transmits the generated random number to the computer 53 (S-61). The central processing unit of the computer 53, which acquires the 64-bit random number, encrypts the random number with the triple DES using the key for authentication stored in the memory and thereafter transmits the encrypted random number to the processor 27 (S-62).

The central processing unit of the microprocessor 27 decrypts the random number encrypted with the triple DES using the key for authentication stored in the memory (S-63). The central processing unit of the processor 27 compares the random number generated by the same and the decrypted random number, judges that the authentication result is valid when the both are identical to each other, and transmits the authentication result valid information to the computer 53. On the other hand, when the generated random number and the decrypted random number are different from each other, this judges that the authentication result is invalid and transmits the authentication result invalid information and inability to read the magnetic card information to the computer 53.

The computer 53 acquires the external authentication result from the microprocessor 27 (S-64).

The authentication procedure in the inner authentication is as follows. The central processing unit of the computer 53 generates the 64-bit random number (authenticator) and transmits the same to the microprocessor 27 (S-65). The central processing unit of the processor 27, which acquires the 64-bit random number, encrypts the random number with the triple DES using the key for authentication stored in the memory and transmits the encrypted random number to the computer 53 (S-66). The central processing unit of the computer 53 decrypts the random number encrypted with the triple DES using the key for authentication stored in the memory (S-67). The central processing unit of the computer 53 compares the random number generated by the same and the decrypted random number and judges that the authentication result is valid when the both are identical to each other. On the other hand, when the generated random number is different from the decrypted random number, this judges that the authentication result is invalid and disapproves the reading of the magnetic card by the card reader 52.

Figure 27:
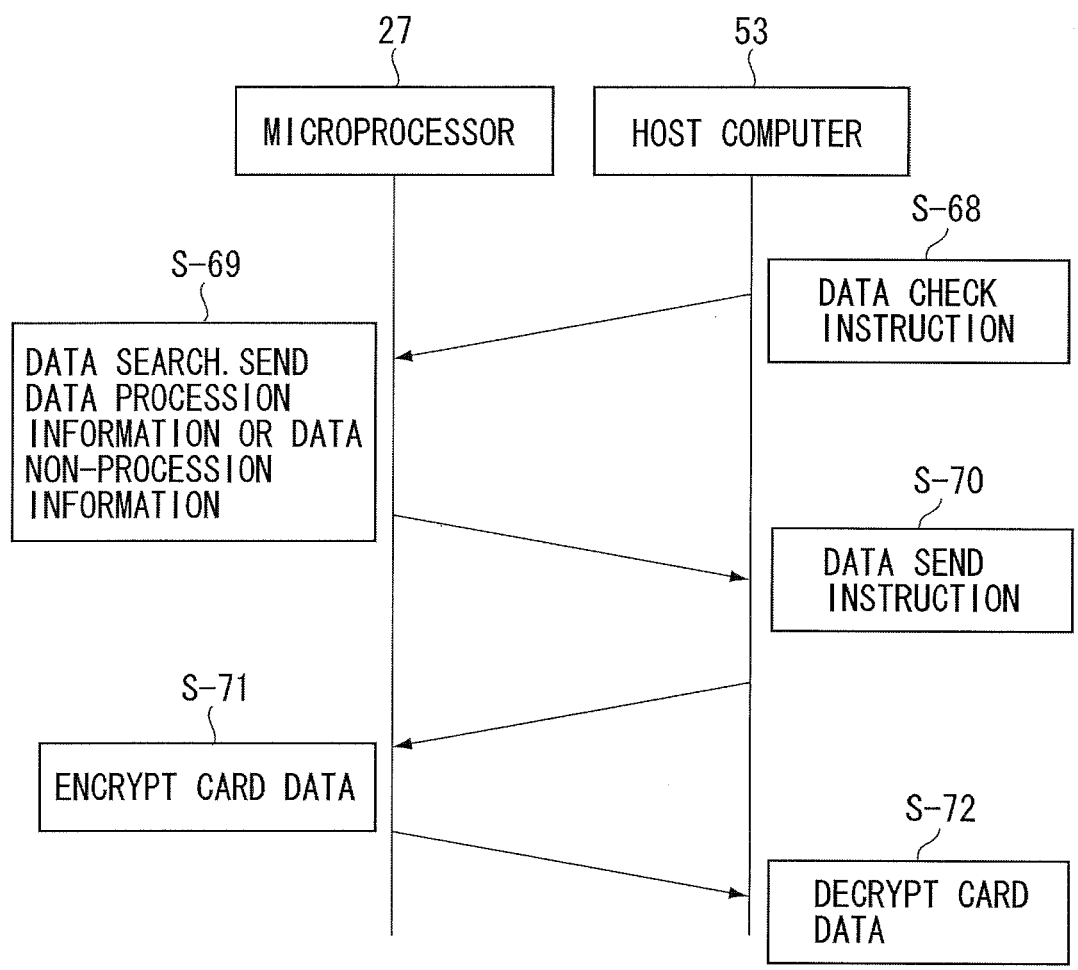
FIG. 27 is a ladder diagram illustrating an example of a main process in a system.

FIG. 27 is a ladder diagram showing an example of main processing in this system 50. FIGS. 28 to 33 are views for explaining other example of generation of keys used for encryption and decryption. After the mutual authentication result is valid and reading data from the magnetic card is enabled, when a card holder inserts the magnetic card from the card insertion opening of the magnetic card reader 52, the motor is driven and the card is moved on the guide rail. When the card passes through the insertion opening, the optical sensor detects this passage, and a card insertion signal is output from the optical sensor to be input to the controller of the magnetic card reader 52. Upon receiving the card insertion signal, the controller outputs a reading start command for card data stored in the card to the microprocessor 27 of the sensor module 10A-10C. When the magnetic card passes through the sensor module 10A-10C and is ejected from the ejection opening, the optical sensors detect this ejection, and a card passage signal is output from the optical sensors to be input to the controller of the card reader 52. Upon receiving the card passage signal, the controller of the card reader 52 outputs a reading stop command for card data to the microprocessor 27 of the sensor module 10A-10C and stops driving of the motor.

When the magnetized magnetic layer in the magnetic card passes through the distal end portion of the core (a gap of the core) in the magnetic head 12, a magnetic flux is generated in the core, an electromotive force is produced in a direction crossing the magnetic flux, and a current flows through the coil. A value of the current flowing through the coil varies with a change in magnetic flux. Card data stored in the magnetic layer in the magnetic card is fetched by the coil as an analog signal to be input to the A/D conversion chip 26 from the magnetic head 12. The A/D conversion chip 26 converts the analog signal input from the magnetic head 12 into a digital signal. The digital signal is input to the microprocessor 27 from the A/D conversion chip 26 and stored in the memory of the microprocessor 27.

During an operation of the system 50, the central processor of the host computer 53 asks the microprocessor 27 whether card data that should be processed is present in the memory of the microprocessor 27 at predetermined intervals (a data conformation command). The central processor of the computer 53 uses an information transmission/reception key stored in the memory to encrypt the data confirmation command based on the triple DES, and transmits the encrypted data confirmation command to the microprocessor 27 (S-68). It is to be noted that the predetermined interval is preferably a unit of seconds or a unit of milliseconds.

Upon receiving the data confirmation command, the central processing unit of the microprocessor 27 uses an information transmission/reception key stored in the memory to decrypt the data confirmation command encrypted based on the triple DES. The central processing unit of the microprocessor 27 searches the memory in accordance with the data confirmation command from the computer 53, transmits information indicative of retention of data to the computer 53 (data retention information) when the card data in the magnetic card is stored in the memory as digital signals, and transmits information indicative of non-retention of data to the computer 53 (data non-retention information) when the card data is not stored in the memory. The microprocessor 27 uses the information transmission/reception key to encrypt the data retention information or the data non-retention information based on the triple DES, and transmits the encrypted data retention information or data non-retention information to the computer 53 (S-69).

Upon receiving the data retention information or the data non-retention information, the central processor of the computer 53 uses the information transmission/reception key to decrypt the data retention information or the data non-retention information based on the triple DES. Upon receiving the data non-retention information, the central processor of the computer 53 again transmits the encrypted data confirmation command to the microprocessor 27 at predetermined intervals, and asks the microprocessor 27 whether card data that should be processing is present in the memory (the data confirmation command). Upon receiving the data retention information, the central processor of the computer 53 requests the microprocessor 27 to transmit card data stored in the memory of the microprocessor 27 (a data transmission command). The central processor of the computer 53 uses the information transmission/reception key to encrypt the data transmission command based on the triple DES, and transmits the encrypted data transmission command to the microprocessor 27 (S-70). When the central processing unit of the microprocessor 27 receives the data transmission command, it uses the information transmission/reception key to decrypt the data transmission command encrypted based on the triple DES.

The central processing unit of the microprocessor 27 takes out a digital signal (the card data) and an encryption key from the memory, and uses this key to encrypt the digital signal, thereby providing encrypted data (data encrypting means) (S-71). The central processing unit of the microprocessor 27 transmits the encrypted data to the host computer 53 (encrypted data transmitting means). The computer 53 has an amplification circuit (not shown) that amplifies encrypted data, takes out decryption key from the memory, and uses this key to decrypt the encrypted data amplified by the amplification circuit (data decrypting means) (S-72).

The computer 53 can display the decrypted digital signal (plain text card data) as textual information in the display (data outputting means) and allow the printer to print the decrypted digital signal (the plain text card data) as printed information (the data outputting means). The computer 53 stores the encrypted digital signal or the decrypted digital signal in the memory (data storing means). When the encrypted data is decrypted, the computer 53 again transmits an encrypted data confirmation command to the microprocessor 27 at predetermined intervals and asks the microprocessor 27 whether card data that should be processed is present in the memory (the data confirmation command).

The central processor of the computer 53 and the central processing unit of the microprocessor 27 sequentially generate the same new second to nth keys required for encryption and decryption of digital signals while being synchronized with each other by using the same finite regressive counter value previously stored in the memory of the computer 53 and the memory of the microprocessor 27 every time an encrypted digital signal is input to the computer 53 (key generating means). An example of a key generation procedure executed by the central processor of the computer 53 and the central processing unit of the microprocessor 27 will now be explained hereinafter with reference to FIGS. 28 to 33. It is to be noted that the regenerative counter value is 1 to 20. However, the regressive counter value is not restricted in particular, and the counter value may be 21 or above.

Figure 28:
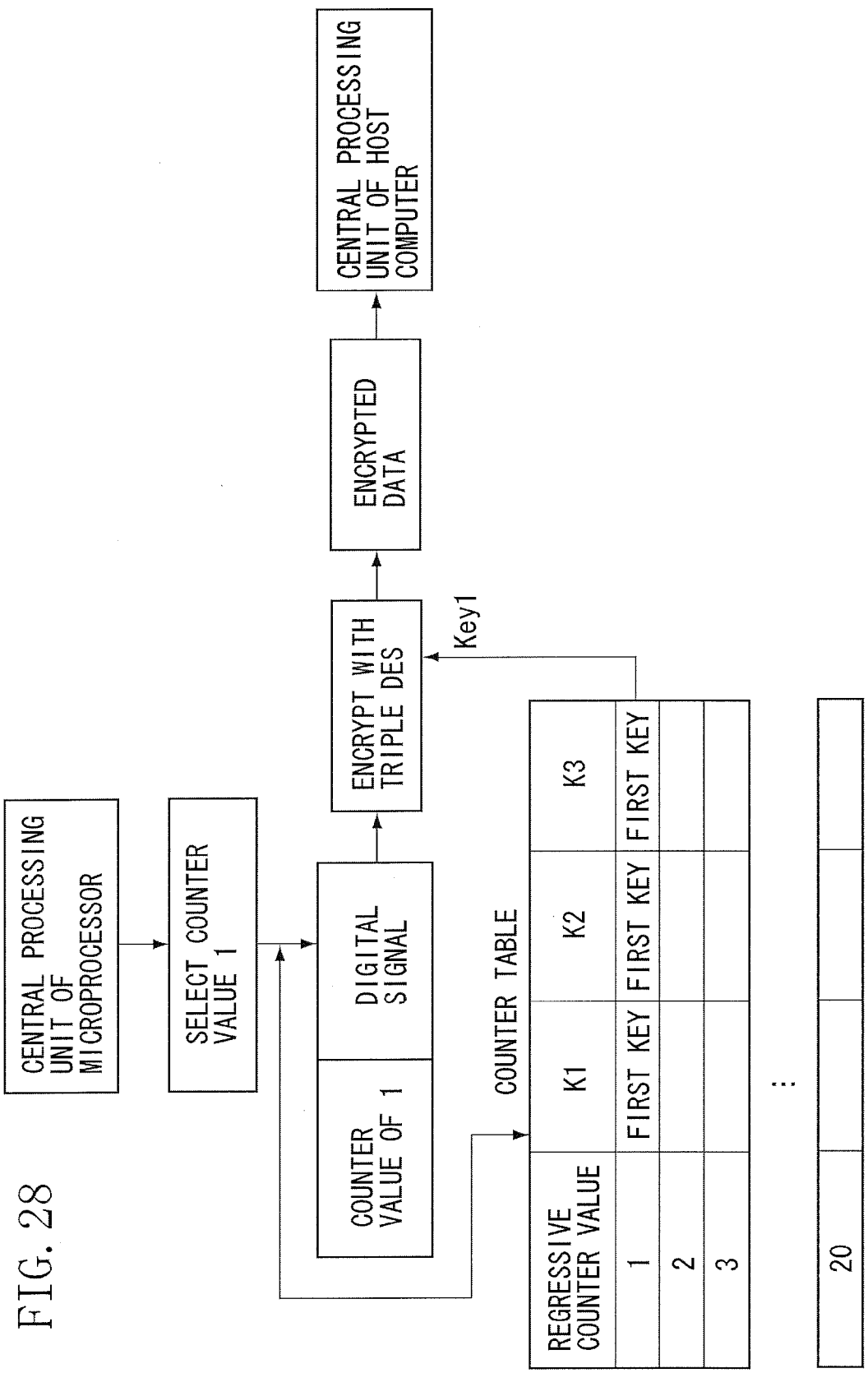
FIG. 28 is a view illustrating another example of the generation of the key used for encryption and decryption.

After activating the system 50, when a data transmission command is received after a first digital signal (card data) is input to the microprocessor 27 from the A/D conversion chip 26 and the digital signal is stored in the memory, the central processing unit of the microprocessor 27 selects a regressive counter value 1 from a counter table stored in the memory and adds the counter value 1 to the digital signal as shown in FIG. 28. A storage area for counter values (1 to 20) and three key storage areas (K1, K2, and K3) associated with this area are formed in the counter table. However, in the counter table shown in FIG. 28, second to 20th keys corresponding to the regressive counter values 2 to 20 are not generated. It is to be noted that a first key (Key 1) corresponding to the counter value 1 is set as an initial value at the time of introduction of the system 50.

The central processing unit of the microprocessor 27 takes out the first key corresponding to the counter value 1 from the counter table, uses the first key to encrypt the digital signal and the counter value 1 based on triple DES (a three-Key triple DES) and thereby provide encrypted data (the data encrypting means), and transmits the encrypted data to the computer 53 (data transmitting means). After transmitting the encrypted data to the computer 53, the central processing unit of the microprocessor 27 changes the regressive counter value from 1 to 2, stores the counter value 2 in the memory, and erases the first digital signal (the card data) from the memory.

Figure 29:
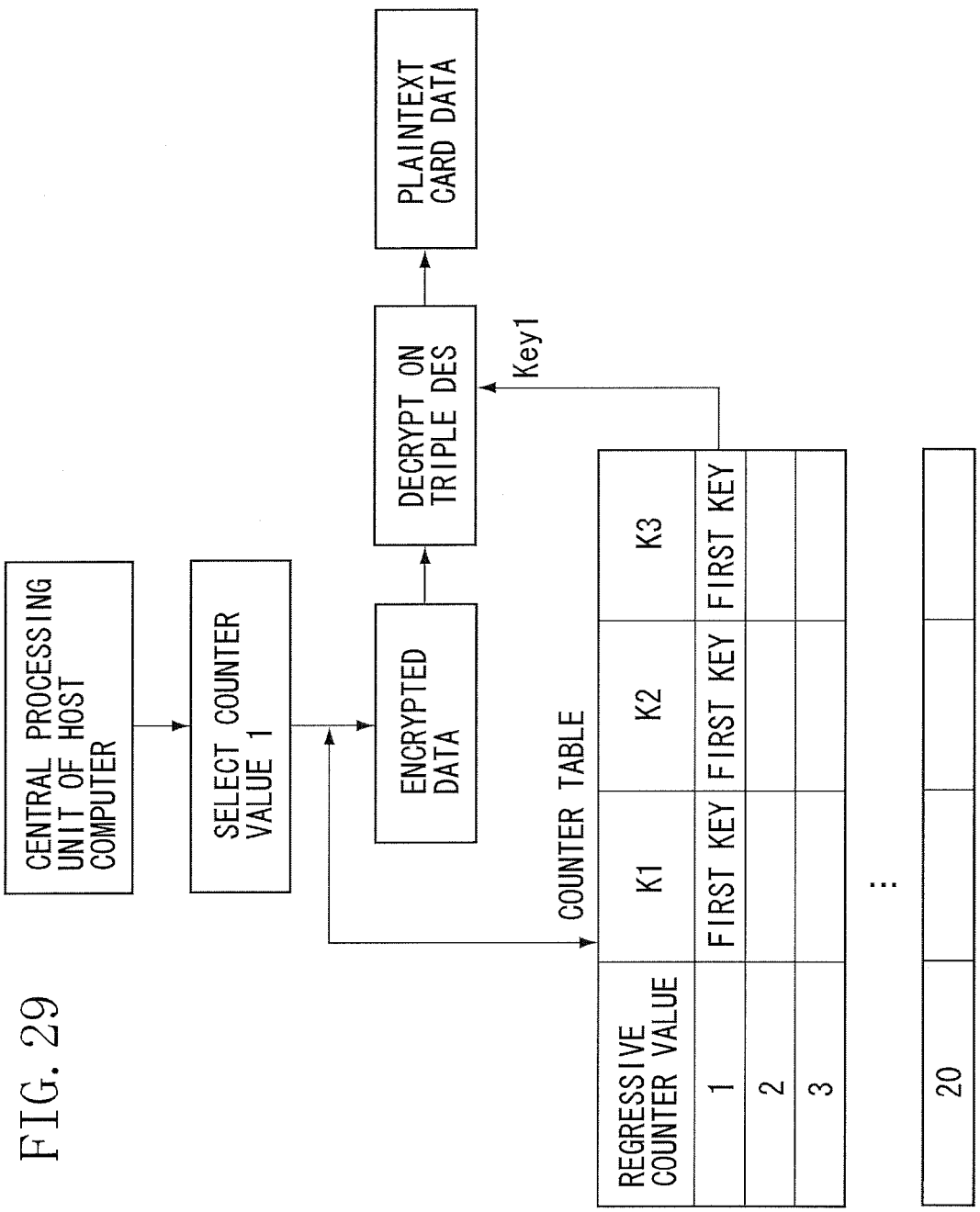
FIG. 29 is a view illustrating another example of the generation of the key used for encryption and decryption.

The central processor of the computer 53 that has received the first encrypted data selects a regressive counter value 1 from a counter table stored in the memory as shown in FIG. 29. In the counter table, a storage area for counter values (1 to 20) and three key storage areas (K1, K2, and K3) associated with this storage area are formed. However, in the counter table shown in FIG. 29, second to 20th keys corresponding to the regressive counter values 2 to 20 are not generated. It is to be noted that the first key (Key 1) corresponding to the counter value 1 is the same as the first key stored in the memory of the microprocessor 27, and it is set as an initial value at the time of introduction of the system 50. The central processor of the computer 53 takes out the first key corresponding to the counter value 1 from the counter table, and uses the first key to decrypt the encrypted data based on the triple DES (three-Key triple DES), thereby obtaining a digital signal (plain text card data). After decrypting the encrypted data, the central processor of the computer 53 changes the regressive counter value from 1 to 2 and stores the counter value 2 in the memory.

Figure 30:
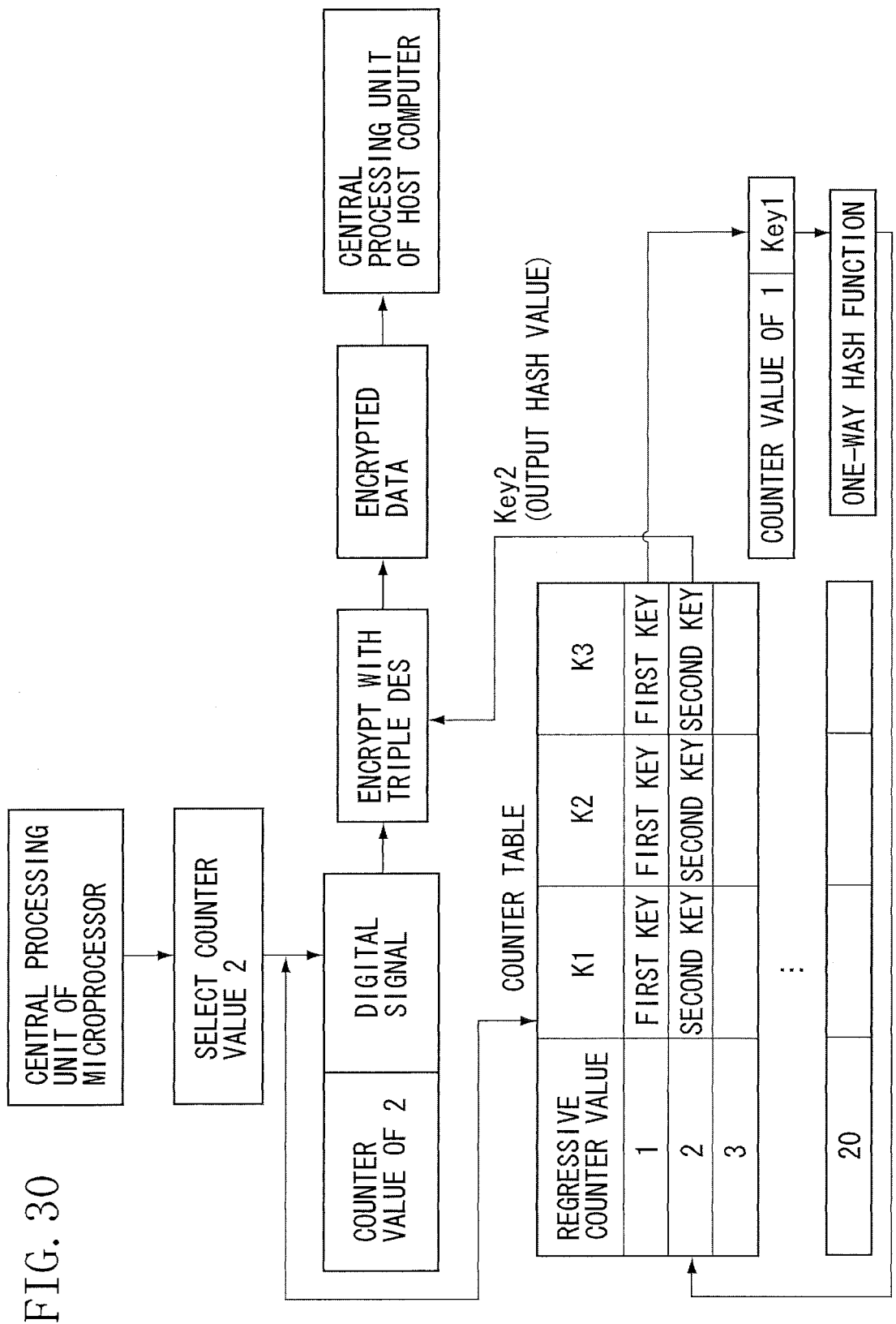
FIG. 30 is a view illustrating another example of the generation of the key used for encryption and decryption.

When a data transmission command is received after a second digital signal (card data) is input to the microprocessor 27 from the A/D conversion chip 26 and the digital signal is stored in the memory, the central processing unit of the microprocessor 27 selects the regressive counter value 2 from the counter table stored in the memory and adds the counter value 2 to the digital signal as shown in FIG. 30. The central processing unit of the microprocessor 27 generates a hashed output value obtained by hashing the first key (the initial value) corresponding to the counter value 1 and the counter value 1 by using a one-way hash function, and determines this hashed output value as a second key (Key 2) corresponding to the counter value 2 (the key generating means). The hashed output value as the second key (Key 2) is written in the key storage areas (K1, K2, and K3) corresponding to the counter value 2 in the counter table. It is to be noted that third to 20th keys corresponding to the regressive counter values 3 to 20 are not generated in the counter table depicted in FIG. 30.

The central processing unit of the microprocessor 27 takes out the second key corresponding to the counter value 2 from the counter table, uses the second key to encrypt the digital signal (including the counter value 2) based on the triple DES (the three-Key triple DES) and thereby provide encrypted data (the data encrypting means), and transmits the encrypted data to the computer 53. After transmitting the encrypted data to the computer 53, the central processing unit of the microprocessor 27 changes the regressive counter value from 2 to 3, stores the counter value 3 in the memory, and erases the second digital signal (the card data) from the memory.

Figure 31:
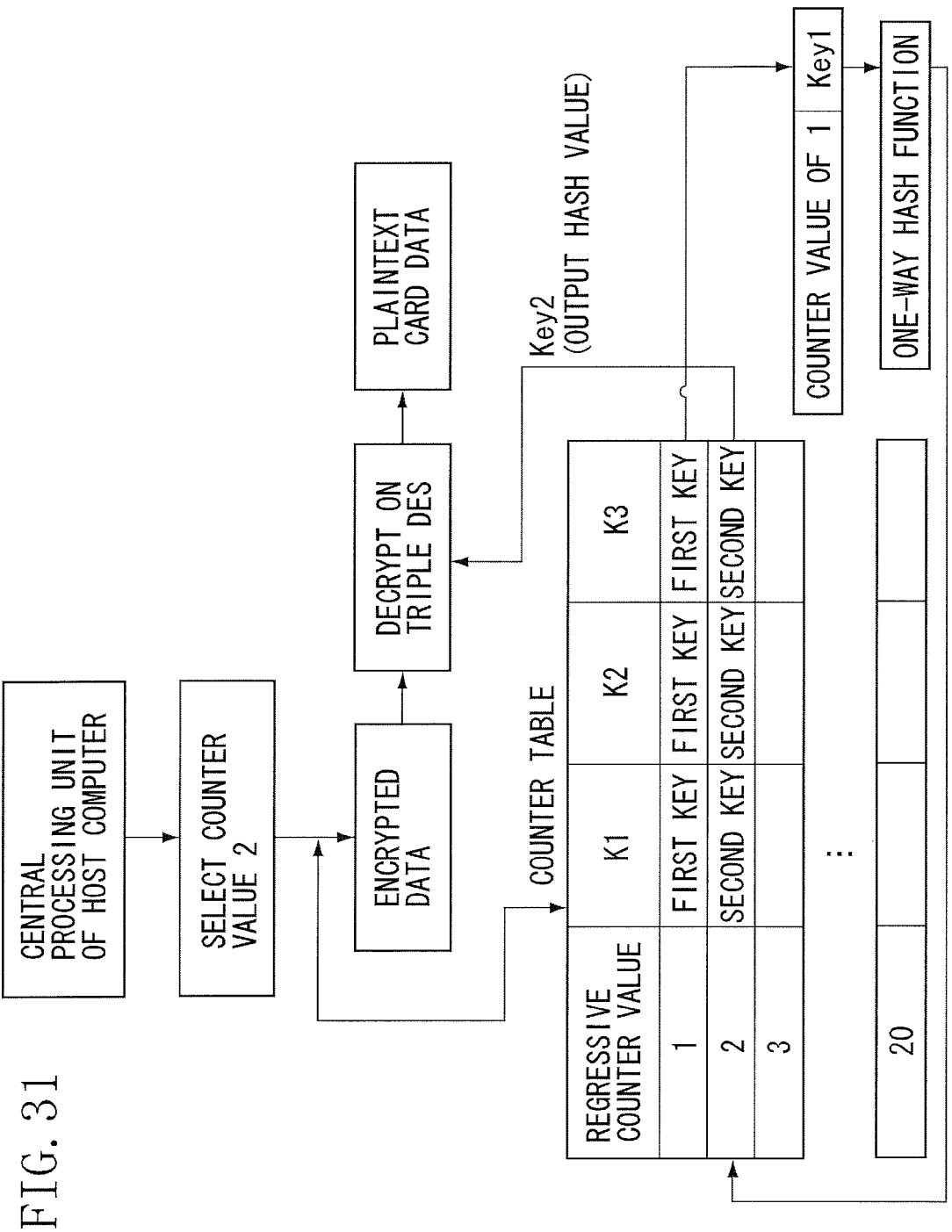
FIG. 31 is a view illustrating another example of the generation of the key used for encryption and decryption.

As shown in FIG. 31, the computer 53 that has received the second encrypted data selects the regressive counter value 2 from the counter table stored in the memory. The central processor of the computer 53 generates a hashed output value obtained by hashing the first key (the initial value) corresponding to the counter value 1 and the counter value 1 by using a one-way hash function, and determines this hashed output value as a second key (Key 2) corresponding to the counter value 2 (the key generating means). The hash function used by the central processor of the computer 53 is the same as that utilized by the central processing unit of the microprocessor 27, and the generated second key (Key 2) is the same as that produced by the central processing unit of the microprocessor 27. The hash output value serving as the second key (Key 2) is written in the key storage areas (K1, K2, and K3) corresponding to the counter value 2 in the counter table. It is to be noted that third to 20th keys corresponding to the regressive counter values 3 to 20 are note generated in the counter table depicted in FIG. 31.

The central processor of the computer 53 takes out the second key corresponding to the counter value 2 from the counter table, and uses the second key to decrypt the encrypted data based on the triple DES (the three-Key triple DES), thereby obtaining a digital signal (plain text card data). After decrypting the encrypted data, the central processor of the computer 53 changes the regressive counter value from 2 to 3, and stores the counter value 3 in the memory.

Figure 32:
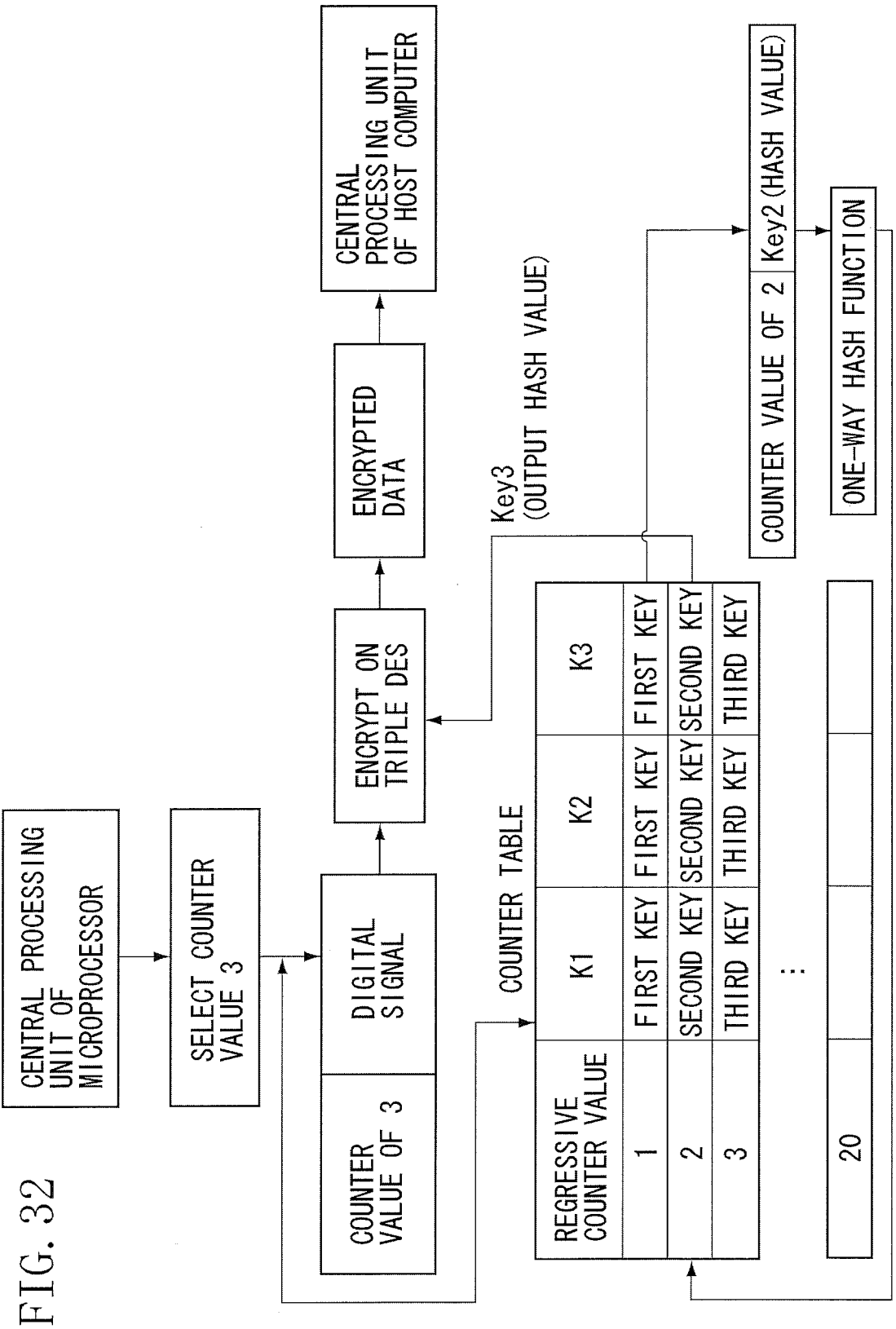
FIG. 32 is a view illustrating another example of the generation of the key used for encryption and decryption.

When a data transmission command is received after a third digital signal (card data) is input to the microprocessor 27 from the A/D conversion chip 26 and the digital signal is stored in the memory, the central processing unit of the microprocessor 27 selects the regressive counter value 3 from the counter table stored in the memory and adds the counter value 3 to the digital signal as shown in FIG. 32. The central processing unit of the microprocessor 27 generates a hashed output value obtained by hashing the second key (Key 2, a hashed value) corresponding to the counter value 2 and the counter value 2 by using the one-way hash function, and determines this hashed output value as a third key (Key 3) corresponding to the counter value 3 (the key generating means). The hashed output value serving as the third key (Key 3) is written in the key storage areas (K1, K2, and K3) corresponding to the counter value 3 in the counter table. It is to be noted that fourth to 20th keys corresponding to the regressive counter values 4 to 20 are not generated in the counter table depicted in FIG. 32.

The central processing unit of the microprocessor 27 takes out the third key corresponding to the counter value 3 from the counter table, uses the third key to encrypt the digital signal (including the counter value 3) based on the triple DES (the three-Key triple DES) and thereby provide encrypted data (the encrypting means), and transmits the encrypted data to the computer 53. After transmitting the encrypted data to the computer 53, the central processing unit of the microprocessor 27 changes the regressive counter value from 3 to 4, stores the counter value 4 in the memory, and erases the third digital signal (the card data) from the memory.

As shown in FIG. 33, the central processor of the host computer 53 that has received the third encrypted data selects the regressive counter value 3 from the counter table stored in the memory. The central processor of the computer 53 generates a hashed output value obtained by hashing the second key (Key 2) corresponding to the counter value 2 and the counter value 2 by using the one-way hash function, and determines this hashed output value as a third key (Key 3) corresponding to the counter value 3 (the key generating means). The third key (Key 3) generated by the central processor of the computer 53 is the same as that produced by the central processing unit of the microprocessor 27. The hashed output value serving as the third key (Key 3) is written in the key storage areas (K1, K2, and K3) corresponding to the counter value 3 in the counter table. It is to be noted that fourth to 20th keys corresponding to the regressive counter values 4 to 20 are not generated in the counter table depicted in FIG. 33.

The central processor of the computer 53 takes out the third key corresponding to the counter value 3 from the counter table, and uses the third key to decrypt the encrypted data based on the triple DES (the three-key triple DES), thereby obtaining a digital signal (plain text card data). After decrypting the encrypted data, the central processor of the computer 53 changes the regressive counter value 3 to 4 and stores the counter value 4 in the memory.

In this manner, the central processor of the host computer 53 and the central processing unit of the microprocessor 27 use the one-way hash function to generate the second to nth keys while sequentially utilizing the regressive counter values 1 to 20 to be synchronized with each other. When the regressive counter value exceeds 20, the central processor of the computer 53 and the central processing unit of the microprocessor 27 again use the counter value 1 to sequentially produce 21st to 40th keys. The central processor of the computer 53 and the central processing unit of the microprocessor 27 rewrite the first key stored in the key storage areas with the 21st key when the 21st key is generated, and rewrite the second key stored in the key storage areas with the 22nd key when the 22nd key is produced.

In this magnetic card reader system 50, since the central processor of the host computer 53 and the central processing unit of the microprocessor 27 can judge mutual validity by executing the mutual authenticating means, even if a false computer is connected with the sensor module 10A-10C or a false sensor module is connected with the computer 53, this connection can be detected. In the system 50, a third party cannot access the system 50 by utilizing a false computer or a false sensor module, and theft of card data in the magnetic card, the hash function, and the keys can be avoided.

In the system 50, since the central processing unit of the microprocessor 27 executes the data encrypting means and the data transmitting means and the central processor of the computer 53 executes the decrypting means after the central processor of the computer 53 and the central processing unit of the microprocessor 27 determine that an authentication result obtained by the authenticating means is valid, theft of card data stored in the magnetic card can be assuredly avoided as compared with a case where these means are executed without performing authentication, thereby assuredly preventing fraudulent duplication of the magnetic card by the third party or "impersonation" by the third party.

In the system 50, since the central processor of the host computer 53 and the central processing unit of the microprocessor 27 individually generate the second to nth keys, the computer 53 does not have to transmit each key to the microprocessor 27, thereby preventing fraudulent acquisition of the key in the key transmission process. In this system 50, since the central processing unit of the microprocessor 27 always uses another key to perform encryption and the central processor of the computer 53 always uses another key to effect decryption, even if a third person acquires a key, card data stored in the magnetic card cannot be decrypted. Further, since hashed values are used as the second to nth keys, even if the third party fraudulently obtains each key, the key cannot be decoded, thus assuredly avoiding use of the key by the third party.

In the system 50, since the central processor of the host computer 53 and the central processing unit of the microprocessor 27 sequentially generate the second to nth keys while using the same finite regressive counter value to be synchronized with each other, the key generated by the computer 53 can be matched with the key produced by the microprocessor 27, and disabled decryption of encrypted data due to mismatch between the generated keys can be avoided. Furthermore, the hashed output values serving as the second to nth keys include hashed output values obtained by hashing the regressive counter values, even if a third party fraudulently accesses the system 50, he/she cannot decode the hashed regressive counter values and cannot judge which counter value is used to achieve synchronization between the central processor of the computer 53 and the central processing unit of the microprocessor 27.

When the central processor of the host computer 53 and the central processing unit of the microprocessor 27 become out of synchronization during an operation of the system 50, the key generated by the central processor of the computer 53 becomes different from the key produced by the central processing unit of the microprocessor 27, and encrypted data transmitted from the central processing unit of the microprocessor 27 cannot be decrypted by the central processor of the computer 53. In this case, the central processor of the computer 53 determines that decryption using the generated key is impossible, informs that decryption is disabled (decryption disabled information), and requests resynchronization (a resynchronization request). The central processor of the computer 53 uses the information transmission/reception key stored in the memory to encrypt the decryption disabled information and the resynchronization request based on the triple DES, and transmits the encrypted decryption disabled information and resynchronization request to the microprocessor 27.

The central processor of the computer 53 and the central processing unit of the microprocessor 27 which has received the resynchronization request again execute external authentication and internal authentication for judging their validity (see FIGS. 15 and 16). When the central processor of the computer 53 and the central processing unit of the microprocessor 27 determine that a mutual authentication result of mutual authentication is valid, they reset the regressive counter value to 1 (an initial value) to again start synchronization. When the counter value is reset to 1, the central processor of the computer 53 and the central processing unit of the microprocessor 27 again use the first key to execute encryption and decryption.

In the system 50, even if the generated keys do not match with each other, the host computer 53 and the microprocessor 27 can reset the regressive counter value to 1 to be again synchronized with each other, and hence the key generated by the computer 53 can be again matched with the key produced by the microprocessor 27, thereby preventing decryption of card data from being disabled due to mismatch between the generated keys. It is to be noted that, in a case where the system 50 continuously operates and mutual authentication is performed daily, weekly, or monthly, the central processor of the computer 53 and the central processing unit of the microprocessor 27 reset the regressive counter value to 1 to be again synchronized with each other when they determine that a mutual authentication result of mutual authentication is valid. The subsequent procedure is the same as that explained with reference to FIGS. 28 to 33.

The host computer 53 can stop use of the currently utilized hash function, select a new hash function from the hash functions stored in the memory, and use the selected hash function. The hash function may be changed every time the system 50 is activated, or changed daily, weekly, or monthly, or changed when synchronization is again achieved after the central processor and the central processing unit become out of synchronization. When using the new hash function, the computer 53 instructs the microprocessor 27 to rewrite the existing hash function (a function change command). The central processor of the computer 53 uses the information transmission/reception key stored in the memory to encrypt the function change command and the new hash function based on the triple DES, and transmits the encrypted function change command and hash function to the microprocessor 27.

Upon receiving the function change command and the hash function, the central processing unit of the microprocessor 27 uses the information transmission/reception key stored in the memory to decrypt the function change command and the hash function encrypted based on the triple DES. The central processing unit of the microprocessor 27 decrypts the existing hash function stored in the memory to be replaced with the new hash function, and informs the computer 53 of completion of the change (change completion notification). The central processing unit of the microprocessor 27 uses the information transmission/reception key stored in the memory to encrypt the change completion notification based on the triple DES, and transmits the encrypted change completion notification to the computer 53. In this system 50, since the function change command or the hash function are encrypted to change the hash function, the hash function to be utilized cannot be acquired by a third party, thereby preventing the hash function from being decoded by the third party.

The host computer 53 can stop use of the currently utilized encryption algorithm, select a new algorithm from the encryption algorithms stored in the memory, and utilize the selected algorithm. The encryption algorithm may be changed every time the system 50 is activated, or changed daily, weekly, or monthly, or may be changed when synchronization is again achieved after the central processor and the central processing unit become out of synchronization. When using the new encryption algorithm, the computer 53 instructs the microprocessor 27 to rewrite the existing algorithm (a function change command). The central processor of the computer 53 uses the information transmission/reception key stored in the memory to encrypt the function change command and the new encryption algorithm based on triple DES, and transmits the encrypted function change command and algorithm to the microprocessor 27.

Upon receiving the function change command and the encryption algorithm, the central processing unit of the microprocessor 27 uses the information transmission/reception key stored in the memory to decrypt the function change command and the algorithm encrypted based on the triple DES. The central processing unit of the microprocessor 27 changes the existing algorithm stored in the memory to the decrypted new algorithm, and then informs the computer 53 of completion of the change (change completion notification). The central processing unit of the microprocessor 27 uses the information transmission/reception key stored in the memory to encrypt the change completion notification based on the triple DES, and transmits the encrypted change completion notification to the computer 53. In this system 50, since the function change command or the encryption algorithm is encrypted and then the algorithm is changed, the algorithm to be utilized cannot be acquired by a third party.

A manual handy card reader to which the sensor modules 10A to 10C are attached may be used in addition to the insertion electric-powered type as the magnetic card reader in the system 50. Alternatively, the magnetic card reader may be connected to a POS system. When the magnetic card reader is connected to the POS system, it is not required to install the controller on the card reader and the connection to the external server 51 is performed by the computer embedded in the POS system. The firmware and the encryption algorithm are downloaded from the external server to the memory of the computer of the POS system to be temporarily stored, then output to the microprocessor 27 of the magnetic head of the card reader.

EXPLANATION OF REFERENCE NUMERALS

10A sensor module
10B sensor module
10C sensor module
11 housing
12 magnetic head (sensor element)
13 flexible substrate
14 signal processing device
17 front-end portion
19 connection terminal installation area
20 electronic component installation area
21 A/D conversion chip installation area
22 microprocessor installation area (digital IC installation area)
24 connection terminal
25 resistive element (electronic component)
26 A/D conversion chip
27 microprocessor (digital IC)
28 epoxy resin (solidification substance)
29 first folding line
30 second folding line
31 third folding line
32 fourth folding line

The invention claimed is:

1. A sensor module, comprising: a flexible substrate extending in one direction; a signal processing device installed on a front-end portion of the flexible substrate; and a sensor element for converting a measured volume from a measuring target to an analog signal, the signal processing device including a connection terminal connected to the sensor element for receiving the analog signal output from the sensor element, an A/D conversion chip connected to the connection terminal for converting the analog signal received by the connection terminal from the sensor element to a digital signal, and a digital IC connected to the A/D conversion chip for encrypting the digital signal output from the A/D conversion chip, wherein the connection terminal, the A/D conversion chip, and the digital IC are installed on the front-end portion of the flexible substrate in a state of being arranged in the one direction, and the front-end portion of the flexible substrate is folded between the connection terminal and the A/D conversion chip and is accommodated in a housing with a predetermined capacity in a state of being folded between the connection terminal and the A/D conversion chip, and the connection terminal, the A/D conversion chip, the digital IC, and the front-end portion of the flexible substrate are fixed to the housing by means of a solidification substance filled in the housing.

2. The sensor module according to claim 1, wherein a portion on which the connection terminal is installed of the front-end portion of the flexible substrate is divided into a connection terminal installation area and an electronic component installation area arranged in the one direction and is folded in the one direction between the connection terminal installation area and the electronic component installation area.

3. The sensor module according to any one of claim 1, wherein the sensor element is a magnetic head having a coil and a core for reading data from a magnetic card in which predetermined data is stored.

* * * * *